(12) United States Patent
Stulov

(10) Patent No.: US 12,736,345 B2
(45) Date of Patent: Sep. 15, 2026

(54) TEMPORAL DECOUPLING IN IMAGE-BASED LOCALIZATION AT SCALE

(71) Applicant: Bear Robotics, Inc., Redwood City, CA (US)

(72) Inventor: Konstantin Stulov, Redwood City, CA (US)

(73) Assignee: Bear Robotics, Inc., Redwood City, CA (US)

( * ) Notice: Subject to any disclaimer, the term of this patent is extended or adjusted under 35 U.S.C. 154(b) by 54 days.

(21) Appl. No.: 18/843,509

(22) PCT Filed: Mar. 2, 2023

(86) PCT No.: PCT/US2023/063574
§ 371 (c)(1),
(2) Date: Sep. 3, 2024

(87) PCT Pub. No.: WO2023/168335
PCT Pub. Date: Sep. 7, 2023

(65) Prior Publication Data

US 2025/0035443 A1 Jan. 30, 2025

Related U.S. Application Data

(60) Provisional application No. 63/268,792, filed on Mar. 2, 2022.

(51) Int. Cl.
*G01C 21/00* (2006.01)
*B25J 9/16* (2006.01)
(Continued)

(52) U.S. Cl.
CPC .......... *G01C 21/005* (2013.01); *B25J 9/1664* (2013.01); *B25J 9/1697* (2013.01); *G06T 1/0014* (2013.01);
(Continued)

(58) Field of Classification Search
CPC ...... G01C 21/005; G06V 20/20; G06V 20/49; G01S 5/16; B60R 1/23; G08G 1/0133;
(Continued)

(56) References Cited

U.S. PATENT DOCUMENTS 7,634,336 B2 12/2009 Chae et al.
7,714,895 B2 5/2010 Pretlove et al.
(Continued)

FOREIGN PATENT DOCUMENTS

JP 10021060 A 1/1998
JP 2005523526 A 8/2005
(Continued)

OTHER PUBLICATIONS

Sandeep Chinchali: "Sampling Training Data for Continual Learning Between Robots and the Cloud" (Year: 2020).*
(Continued)

*Primary Examiner* — Yuri Kan
(74) *Attorney, Agent, or Firm* — Morgan, Lewis & Bockius LLP

(57) ABSTRACT

A computer-implemented method and apparatus to generate an image-based localization model for mobile robot navigation. The method includes performing data collection at a plurality of different service locations, to which a fleet of mobile robots is deployable, to generate collected data, dividing the collected data into a plurality of blocks of consecutive portions of the collected data, generating a first image-based localization model and a second image-based localization model for a first and respectively, second service location of the plurality of different service locations, using the collected data. The method further includes deploying the first image-based localization model and the second image-based localization model to a first and, respectively, second mobile robot of the fleet of mobile robots, the first
(Continued)

image-based localization model and the second image-based localization model being used to navigate the first and, respectively, the second service location of the plurality of different service locations.

17 Claims, 18 Drawing Sheets

(51) Int. Cl.
*G06T 1/00* (2006.01)
*G06T 7/70* (2017.01)
*G06T 7/73* (2017.01)

(52) U.S. Cl.
CPC .................. *G06T 7/70* (2017.01); *G06T 7/73* (2017.01); *G06T 2207/10016* (2013.01); *G06T 2207/20021* (2013.01); *G06T 2207/20081* (2013.01); *G06T 2207/20084* (2013.01)

(58) Field of Classification Search
CPC ....... G05D 1/0212; G06F 18/23; G06F 18/22; G06T 7/73; H04L 63/1416
See application file for complete search history.

(56) References Cited

U.S. PATENT DOCUMENTS

| | | | | |
|---|---|---|---|---|
| 8,380,384 | B2 | 2/2013 | Lee et al. | |
| 9,058,521 | B2 | 6/2015 | Yoon et al. | |
| 9,619,561 | B2 * | 4/2017 | Chrysanthakopoulos | G06V 20/20 |
| 10,581,883 | B1 * | 3/2020 | Syme | H04L 63/1416 |
| 10,814,474 | B2 | 10/2020 | Newman et al. | |
| 11,048,268 | B2 | 6/2021 | Ouyang | |
| 11,354,820 | B2 * | 6/2022 | Urtasun | G06F 18/22 |
| 2014/0010407 | A1 * | 1/2014 | Sinha | G06T 7/73 382/103 |
| 2018/0082147 | A1 * | 3/2018 | Heinly | G06F 18/23 |
| 2018/0174038 | A1 | 6/2018 | Jiang et al. | |
| 2019/0212752 | A1 | 7/2019 | Fong et al. | |
| 2019/0313576 | A1 | 10/2019 | Haneda et al. | |
| 2019/0354110 | A1 * | 11/2019 | Heinla | G05D 1/0212 |
| 2020/0078944 | A1 | 3/2020 | Li et al. | |
| 2021/0109541 | A1 | 4/2021 | Joo et al. | |
| 2021/0213616 | A1 | 7/2021 | Ross et al. | |
| 2021/0221001 | A1 | 7/2021 | Scott et al. | |
| 2021/0224579 | A1 | 7/2021 | Jones et al. | |
| 2021/0229291 | A1 | 7/2021 | Yang et al. | |
| 2021/0233390 | A1 * | 7/2021 | Georgiou | G08G 1/0133 |
| 2022/0009415 | A1 * | 1/2022 | Broggi | B60R 1/23 |
| 2022/0179038 | A1 * | 6/2022 | Huffman | G01S 5/16 |
| 2025/0196349 | A1 * | 6/2025 | Stulov | G06V 20/49 |
| 2025/0241499 | A1 | 7/2025 | Jones et al. | |

FOREIGN PATENT DOCUMENTS

| | | | |
|---|---|---|---|
| JP | 2015172878 | A | 10/2015 |
| JP | 2018109848 | A | 7/2018 |
| JP | 2019091102 | A | 6/2019 |
| JP | 2019121364 | A | 7/2019 |
| JP | 2019121365 | A | 7/2019 |
| JP | 2020149186 | A | 9/2020 |
| JP | 2021039525 | A | 3/2021 |
| JP | 2021124901 | A | 8/2021 |
| KR | 10-2019-0114652 | A | 10/2019 |
| KR | 10-2020-0134807 | A | 12/2020 |
| KR | 10-2021-0096523 | A | 8/2021 |
| KR | 20210096523 | A | 8/2021 |
| WO | WO-2021026427 | A1 | 2/2021 |
| WO | WO-2023168334 | A1 | 9/2023 |
| WO | WO-2023168335 | A1 | 9/2023 |

OTHER PUBLICATIONS

"CIFAR 100: Transfer Learning using EfficientNet", towardsdatascience.com/cifar-100-transfer-learning-using-efficientnet-ed3ed7b89af2, (Mar. 30, 2021), 24 pgs.
"Complete Architectural Details of all EfficientNet Models", towardsdatascience.com/complete-architectural-details-of-all-efficientnet-models-5fd5b736142, (May 31, 2020), 14 pgs.
"Data Augmentation in SSD (Single Shot Detector)", telesens.co/2018/06/28/data-augmentation-in-ssd, (Jun. 28, 2018), 8 pgs.
"International Application Serial No. PCT/US2023/063573, International Search Report mailed May 17, 2023", 4 pgs.
"International Application Serial No. PCT/US2023/063573, Written Opinion mailed May 17, 2023", 8 pgs.
"International Application Serial No. PCT/US2023/063574, International Search Report mailed Jun. 8, 2023", 3 pgs.
"International Application Serial No. PCT/US2023/063574, Written Opinion mailed Jun. 8, 2023", 3 pgs.
"Keras Applications", keras.io/api/applications, 5 pgs.
"Robot Localization an Introduction", Wiley Encyclopedia of Electrical and Electronics Engineering, (2016), 10 pgs.
"Transfer Learning in Image Classification: how much training data do we really need", towardsdatascience.com/transfer-learning-in-image-classification-how-much-training-data-do-we-really-need-7fb570abe774, (Jun. 30, 2020), 26 pgs.
Aider, O. Ait, et al., "Localisation by camera of a rehabilitation robot", ICORR'2001, (Apr. 2001), 9 pgs.
Aider, O.Ait, et al., "A Model to Image Straight Line Matching Method for Vision-Based Indoor Mobile Robot Self-Location", IROS'2002, Lausanne,, (Mar. 2002), 7 pgs.
Aider, Omar Ait, "Model Based Localization for an Indoor Mobile Robot", ResearchGate, (Mar. 23, 2012), 145 pgs.
Akcin, Oguzhan, et al., "Decentralized Data Collection for Robotic Fleet Learning: A Game-Theoretic Approach", [Online] Retrieved from the internet: <https://proceedings.mlr.press/v205/akcin23a/akcin23a.pdf>, (Jun. 16, 2022), 11 pgs.
Betke, Margrit, et al., "Mobile robot localization using landmarks", IEEE Transactions on Robotics and Automation, (Apr. 27, 1995), 39 pgs.
Blanc, G., et al., "Indoor Navigation of Mobile Robot: An Image Based Approach", ResearchGatte, (Jan. 2004), 7 pgs.
Chinchali, Sandeep, et al., "Sampling Training Data for Continual Learning Between Robots and the Cloud", The 17th International Symposium, In: Experimental Robotics : The 17th International Symposium, (Jan. 1, 2021), 11 pgs.
Foroughi, Farzin, et al., "A CNN Based System for Mobile Robot Navigation in Indoor Environments via Visual Localization with a Small Dataset", World Electric Vehicle Journal, (Aug. 2021), 23 pgs.
Geng, Yuchong, et al., "Decentralized Sharing and Valuation of Fleet Robotic Data", [Online] Retrieved from the internet: <https://proceedings.mlr.press/vl64/geng22a/geng22 a.pdf>, (Jul. 13, 2021), 6 pgs.
Kendall, Alex, et al., "PoseNet: A Convolutional Network for Real-Time 6-DOF Camera Relocalization", arXiv:1505.07427v4 [cs.CV], (Feb. 18, 2016), 9 pgs.
Mooers, Adam, et al., "A comparison of Computer Vision Techniques for Indoor Robot Localization", ResearchGate, (Dec. 2016), 6 pgs.
Panigrahi, Prabin Kumar, et al., "Localization strategies for autonomous mobile robots: A review", Journal of King Saud University—Computer and Information Sciences, (Feb. 2021), 21 pgs.
Rosenfelder, "Transfer Learning with EfficientNet for Image Regression in Keras—Using Custom Data in Keras", rosenfelder.ai/keras-regression-efficient-net, (Oct. 19, 2020), 23 pgs.
Sibai, Fadi N., et al., "Evaluation of Indoor Mobile Robot Localization Techniques", Journal of Emerging Trends in Computing and Information Sciences, vol. 4, (2009-2013), 8 pgs.
Simsarian, Kristian T., et al., "View Invariant Regions and Mobile Robot Self Localization", IEEE Transactions on Robotics and Automation, (Mar. 1996), 28 pgs.
Solawetz, Jacob, "The Train, Validation, Test Split and Why You Need It", blog.roboflow.com/train-test-split, (Sep. 4, 2020), 6 pgs.

(56) References Cited

OTHER PUBLICATIONS

Tan, Mingxing, et al., "EfficientNet: Rethinking Model Scaling for Convolutional Neural Networks", arXiv:1905.11946v5 [cs.LG], (Sep. 11, 2020), 11 pgs.
Xiang, Yu, et al., "PoseCNN: A Convolutional Neural Network for 6D Object Pose Estimation in Cluttered Scenes", arXiv:1711.00199v3 [cs.CV], (May 26, 2018), 10 pgs.
Notice of Reasons for Refusal issued on Oct. 28, 2025 for JP Application No. 2024-552293 filed on Mar. 2, 2023.
Request for the Submission of an Opinion issued in KR Application No. 10-2024-7032716 on Feb. 23, 2026, pp. 7.
Request for the Submission of an Opinion issued in KR Application No. 110-2024-7032717 on Feb. 6, 2026, pp. 6.
Decision to Grant a Patent issued in JP Application No. 2024-552292 on Mar. 24, 2026, pp. 2.
Decision to Grant a Patent issued in JP Application No. 2024-552293 on Mar. 31, 2026, pp. 2.

* cited by examiner

902

Train Data Distribution with Median Cell Pose

Grid_Cell_Size=3.0

FIG. 9

TEMPORAL DECOUPLING IN IMAGE-BASED LOCALIZATION AT SCALE

This application claims the benefit of priority to U.S. Patent Application Ser. No. 63/268,792, filed Mar. 2, 2022, which is incorporated herein by reference in its entirety.

TECHNICAL FIELD

The present disclosure generally relates to robot navigation and robot localization.

BACKGROUND

Mobile robot localization technology seeks to provide reliable solutions for determining where a mobile robot may be at any point in time. Estimation of robot pose (e.g., position and orientation) relative to a coordinate system presents a number of technical challenges and may be accomplished using a robot navigation model.

Designing and deploying a custom model for robot navigation in a particular environment may require that many components of the navigation model be manually adjusted or "tweaked" until the custom model delivers satisfactory performance. Substantial technical challenges arise when a robot deployment is scaled from a single instance deployment to the production scale across multiple and diverse environments. When a robot fleet size includes large numbers of robots (e.g., tens, hundreds, or even thousands of robots), these technical challenges may be substantial and are multiplied as the robot fleet increases in size.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 shows a random sample of several trips worth of raw data collected by mobile robots, in the context of a map divided into grid cells of configurable size, according to some examples.

DETAILED DESCRIPTION

Examples disclosed herein implement an automated robot training and deployment system for image-based localization models that can scale to larger fleets of robots. Examples disclosed herein implement multiple temporal data decoupling strategies or policies for data used to produce image-based localization models.

Processes and systems for producing a single model for a given location are described for the purposes of explanation. However, example model generation and deployment pipelines that can scale to multiple locations are described.

Figure 1:
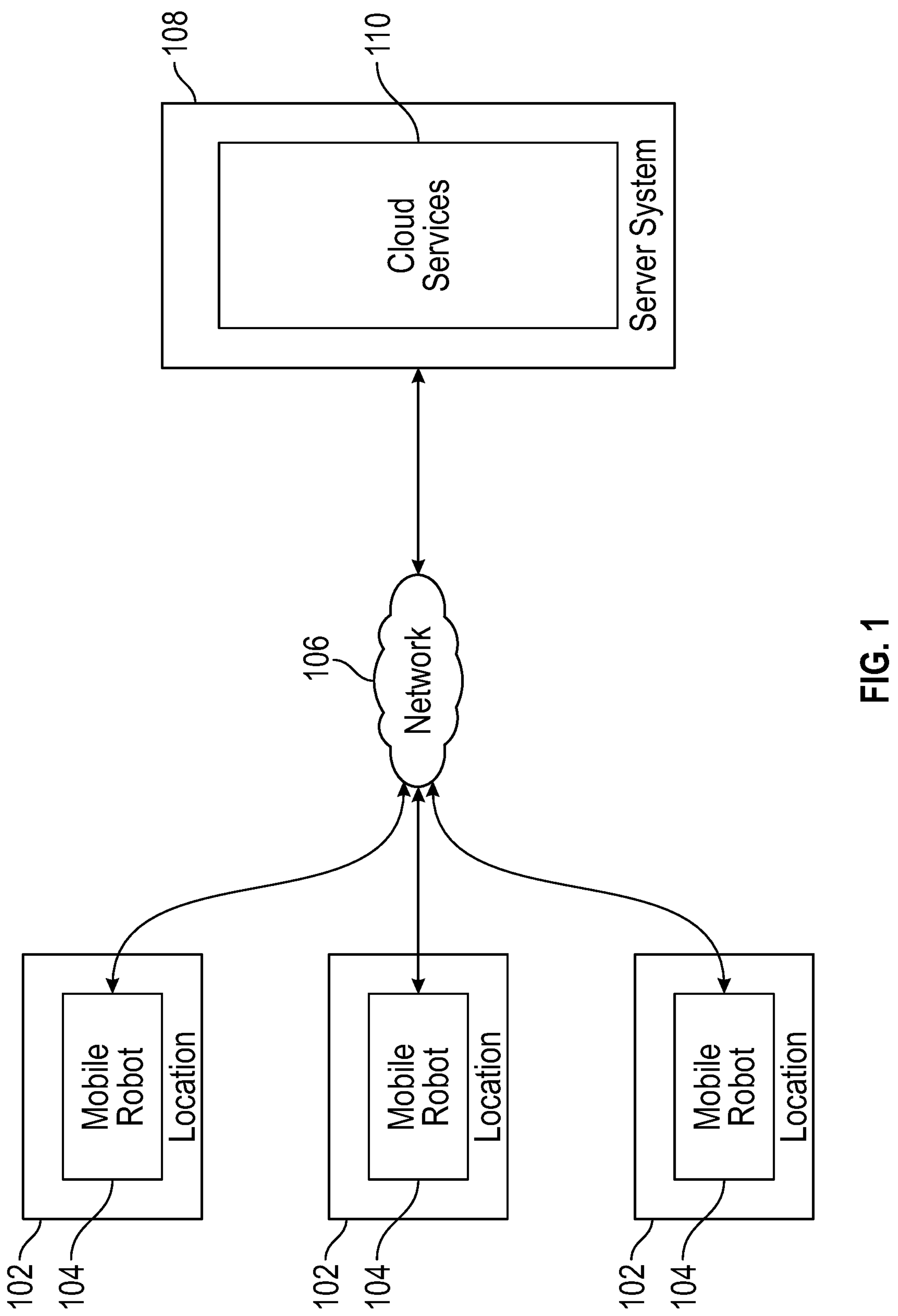
FIG. 1 is a diagrammatic representation of an environment in which multiple mobile robots (e.g., a fleet of service robots) are deployed to respective locations or environments, such as restaurants, hospitals, or senior care facilities, according to some examples.

FIG. 1 is a diagrammatic representation of an environment in which multiple mobile robots 104 (e.g., a fleet of service robots) are deployed to respective locations 102 or environments, such as restaurants, hospitals, or senior care facilities. Depending on the location, the mobile robots 104 may perform several functions within the location 102. Taking the example where these locations 102 are service locations such as restaurants, the mobile robots 104 may operate to assist with the delivery of items from a kitchen to tables within a particular restaurant, as well as the transportation of plates, trash, etc., from tables back to the kitchen.

Each of the mobile robots 104 is communicatively coupled by a network 106, or multiple networks 106, to cloud services 110, which reside at one or more server systems 108.

Figure 2:
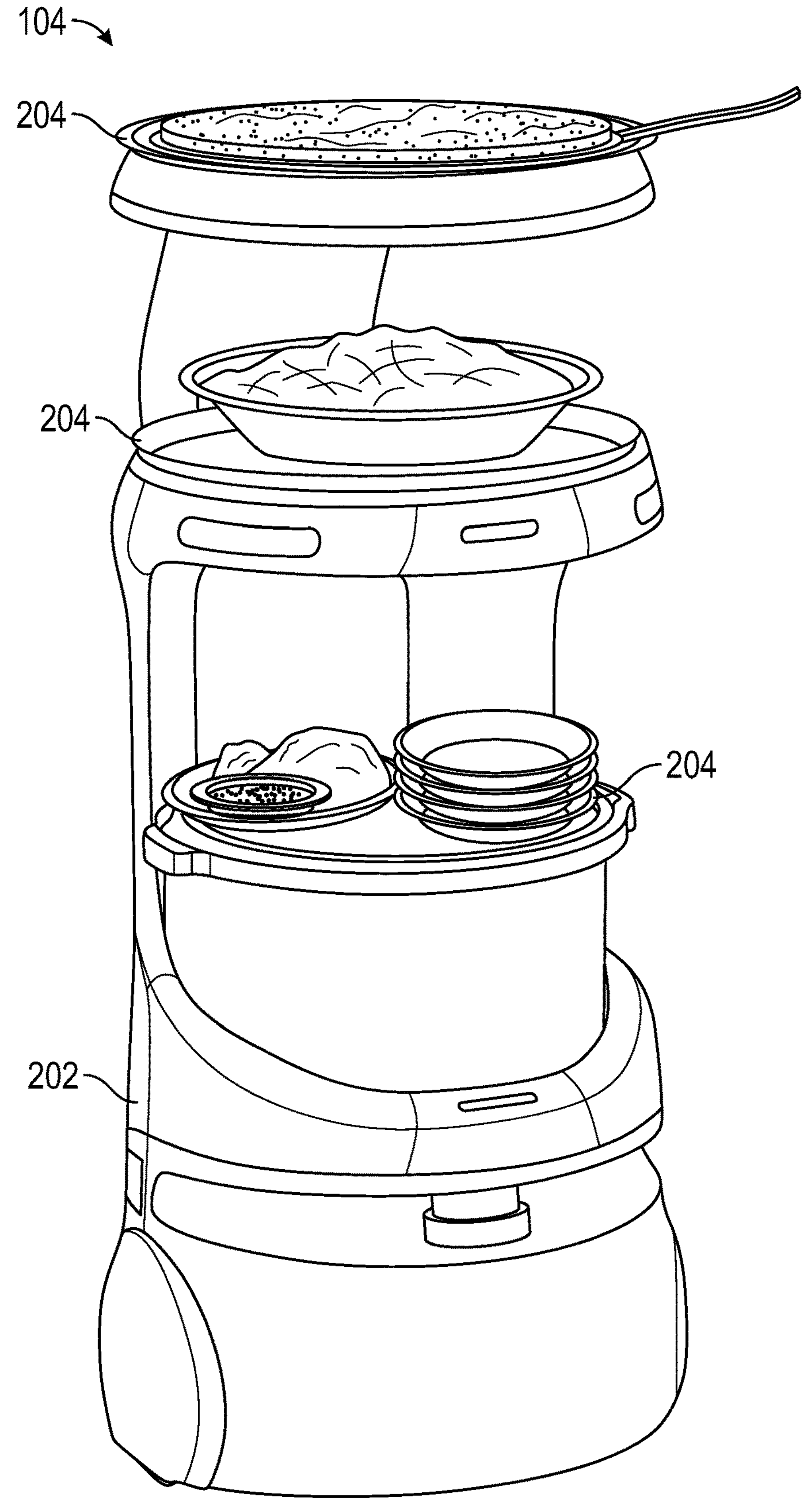
FIG. 2 is a view of an example mobile robot that may be deployed within a location, such as a restaurant.

FIG. 2 is a view of an example mobile robot 104 that may be deployed within a location 102, such as a restaurant. The mobile robot 104 has a chassis or housing 202 that accommodates various components and modules, including a locomotion system with wheels or tracks that enable the mobile robot 104 to propel itself within a service location. A power source for the mobile robot 104 may be a rechargeable battery that provides the energy required to operate these components and modules. Navigation systems and perception systems are also accommodated within the housing 202. The housing 202 supports a number of trays 204 that can accommodate plates and other dishes delivered to and from a kitchen within a location 102 to tables. The mobile robot 104 may also have manipulators (not shown), such as robotic arms that enable the robot to manipulate objects or perform tasks such as picking up objects or opening doors.

The mobile robot 104 may include multiple sensors, including exteroceptive sensors, for capturing information regarding an environment or location within which a mobile robot 104 may be operating, and proprioceptive sensors for capturing information related to the mobile robot 104 itself. Navigation systems enable the mobile robot 104 to map its environment and plan paths to reach destinations. Perception systems process sensor data to recognize objects, detect obstacles, and interpret an operating environment of the mobile robot 104.

Examples of exteroceptive sensors include vision sensors (e.g., two-dimensional (2D), three-dimensional (3D), depth and RGB cameras), light sensors, sound sensors (e.g., microphones or ultrasonic sensors), proximity sensors (e.g., infrared (IR) transceiver, ultrasound sensor, photoresistor), tactile sensors, temperature sensors, navigation and positioning sensors (e.g., Global Positioning System (GPS) sensor). Visual odometry and visual-SLAM (simultaneous localization and mapping) may assist a mobile robot 104 in navigating both indoor and outdoor environments where lighting conditions are reasonable and may, in some examples, be maintained. 3D cameras, depth, and stereo vision cameras provide pose (e.g., position and orientation) information.

Examples of proprioceptive sensors include inertial sensors (e.g., tilt and acceleration), accelerometers, gyroscopes, magnetometers, compasses, wheel encoders, and temperature sensors. Inertial Measurement Units (IMUs) within a mobile robot 104 may include multiple accelerometers and gyroscopes, as well as magnetometers and barometers. Instantaneous pose (e.g., position and orientation) of the mobile robot 104, velocity (linear, angular), acceleration (linear, angular), and other parameters may be obtained through IMUs.

Figure 3:
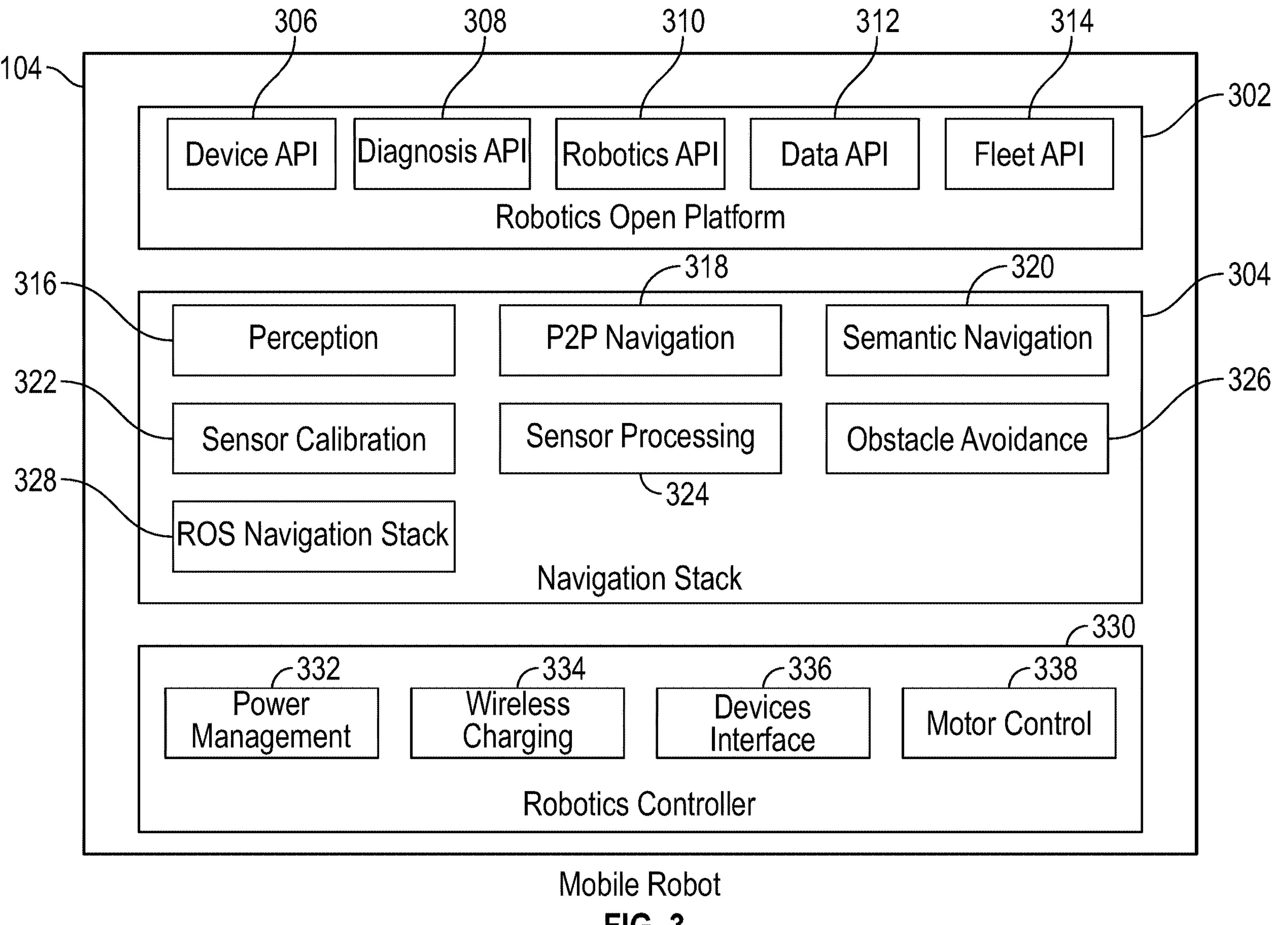
FIG. 3 is a block diagram illustrating one view of components and modules of a mobile robot, according to some examples.

FIG. 3 is a block diagram illustrating one view of components and modules of a mobile robot 104, according to some examples. The mobile robot 104 includes a robotics open platform 302, a navigation stack 304, and a robotics controller 330.

The robotics open platform 302 provides several Application Program Interfaces (APIs), including:

a device API 306
a diagnosis API 308
a robotics API 310
a data API 312; and
a fleet API 314

The navigation stack 304 includes components that support:

perception 316
peer-to-peer (P2P) navigation 318
semantic navigation 320
sensor calibration 322
sensor processing 324
obstacle avoidance 326.

A ROS navigation stack 328 also forms part of the navigation stack 304.

The robotics controller 330 comprises components that support:

power management 332
wireless charging 334
devices interface 336
motor control 338.

Figure 4:
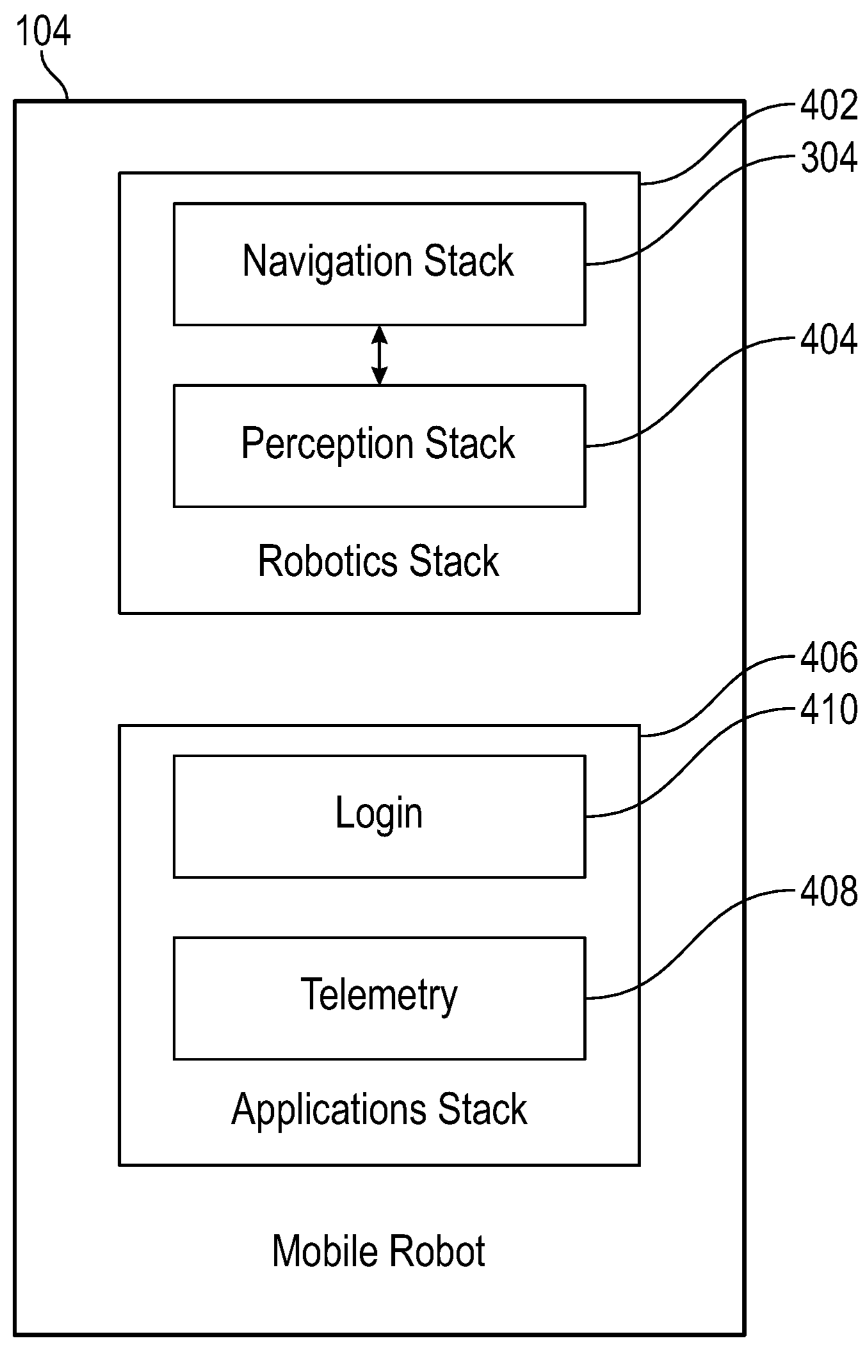
FIG. 4 is a block diagram illustrating another view of the components and modules of a mobile robot, according to some examples.

FIG. 4 is a block diagram illustrating another view of the components and modules of a mobile robot 104, according to some examples. The mobile robot 104 includes a robotics stack 402 and an applications stack 406. The robotics stack 402, in turn, includes a perception stack 404 and a navigation stack 304. The applications stack 406 provides telemetry 408 and login 410 services for the mobile robot 104.

Figure 5:
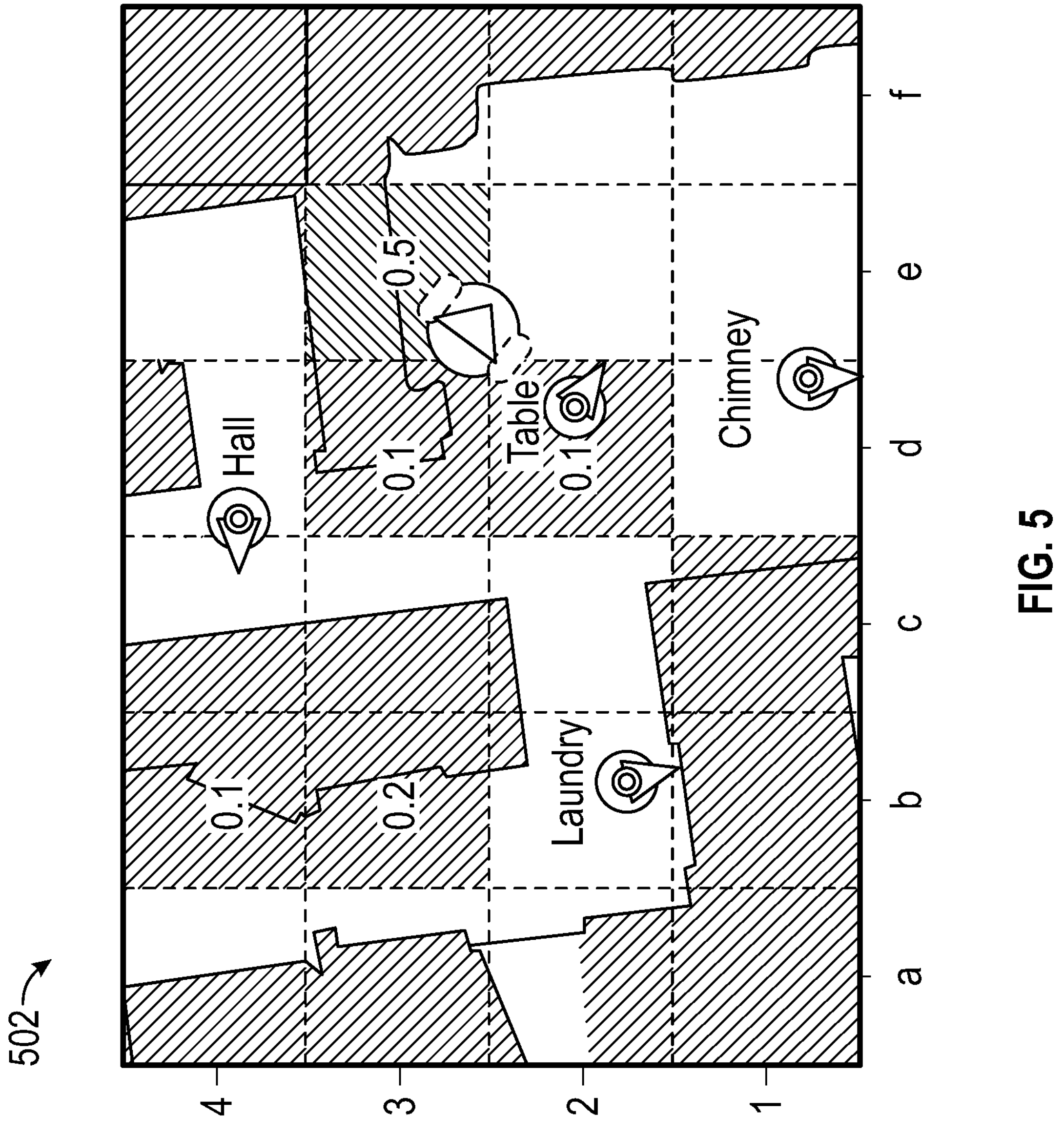
FIG. 5 shows an output of an image-based localization model, according to some examples.

FIG. 5 shows an output of an image-based localization model 604, according to some examples. Creation and maintenance of image-based localization models are further discussed in FIG. 6 and FIG. 7 below.

An image-based localization model (or an image localization model) can be used by a mobile robot (to which the model is deployed) to navigate an area or environment, such as a service location. An example image-based localization model may take as input an image (e.g., an image capture in a particular environment or location) and output a set of potential poses or pose estimates. A pose may include a candidate location (e.g., a grid cell of a configurable size in a grid corresponding to a map of a navigable area). A pose may include a set of (x, y, yaw) values, where x and y are map or world coordinates and yaw is a yaw angle (corresponding to orientation information). In some examples, a pose may include a pitch value and a roll value (corresponding to orientation information). In some examples, a localization model may output a set of potential locations such as grid cells, as well as x- and y- offset predictions within each grid cell together with one or more of yaw, pitch and roll values. Each type of predicted value above (e.g., grid cell, x- and y- offsets, etc.) may be accompanied by a confidence score, or probability value, indicating the confidence of the model in the prediction.

FIG. 5 shows an example output of an image-based localization model 604 that takes as input an image (e.g., from the front camera of a mobile robot 104) and produces a probability distribution over a set of potential locations, where each location is represented as a grid cell in a grid corresponding to a map of the navigable area. In this example, the model returns the following list of (grid cell, probability) pairs: [((e, 3), 0.5); ((b, 3), 0.2); ((b, 4), 0.1); ((d, 2), 0.1); ((d, 3), 0.1)]. Therefore, the model may, in this example, correctly identify the grid cell corresponding to the most likely location for a mobile robot 104 in the given environment.

Figure 6:
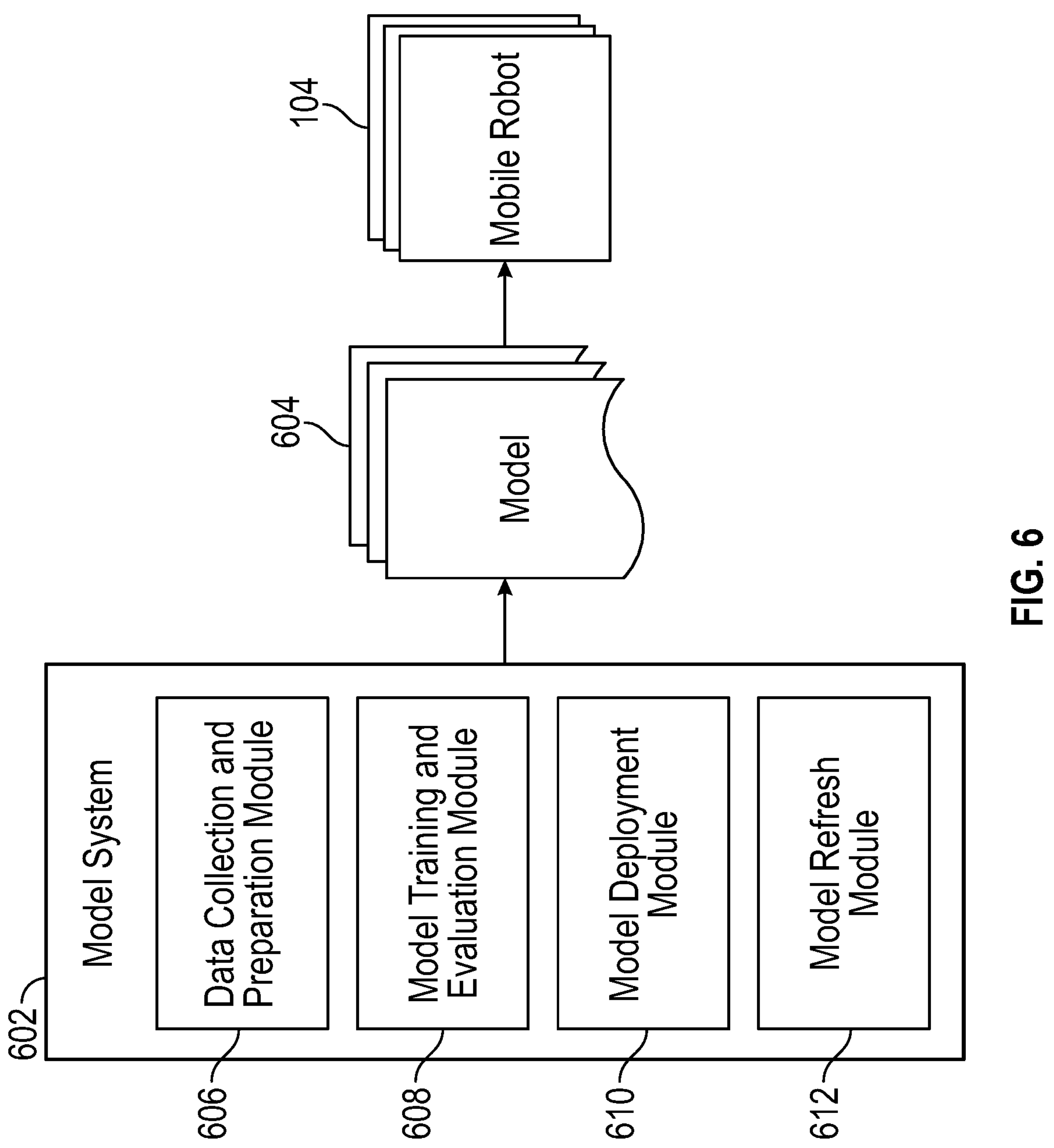
FIG. 6 is a block diagram showing a model system, according to some examples, that operates to create and maintain image-based localization models that are deployed at various mobile robots at one or more locations.

FIG. 6 is a block diagram showing a model system 602, according to some examples, that operates to create and maintain image-based localization models 604 that are deployed at various mobile robots 104 at one or more locations 102. The model system 602 may include the following components or modules:

Data collection and preparation module 606;
Model training and evaluation module 608;
Model deployment module 610; and
Model refresh module 612.

Further details regarding the operations of these example modules are provided below.

Figure 7:
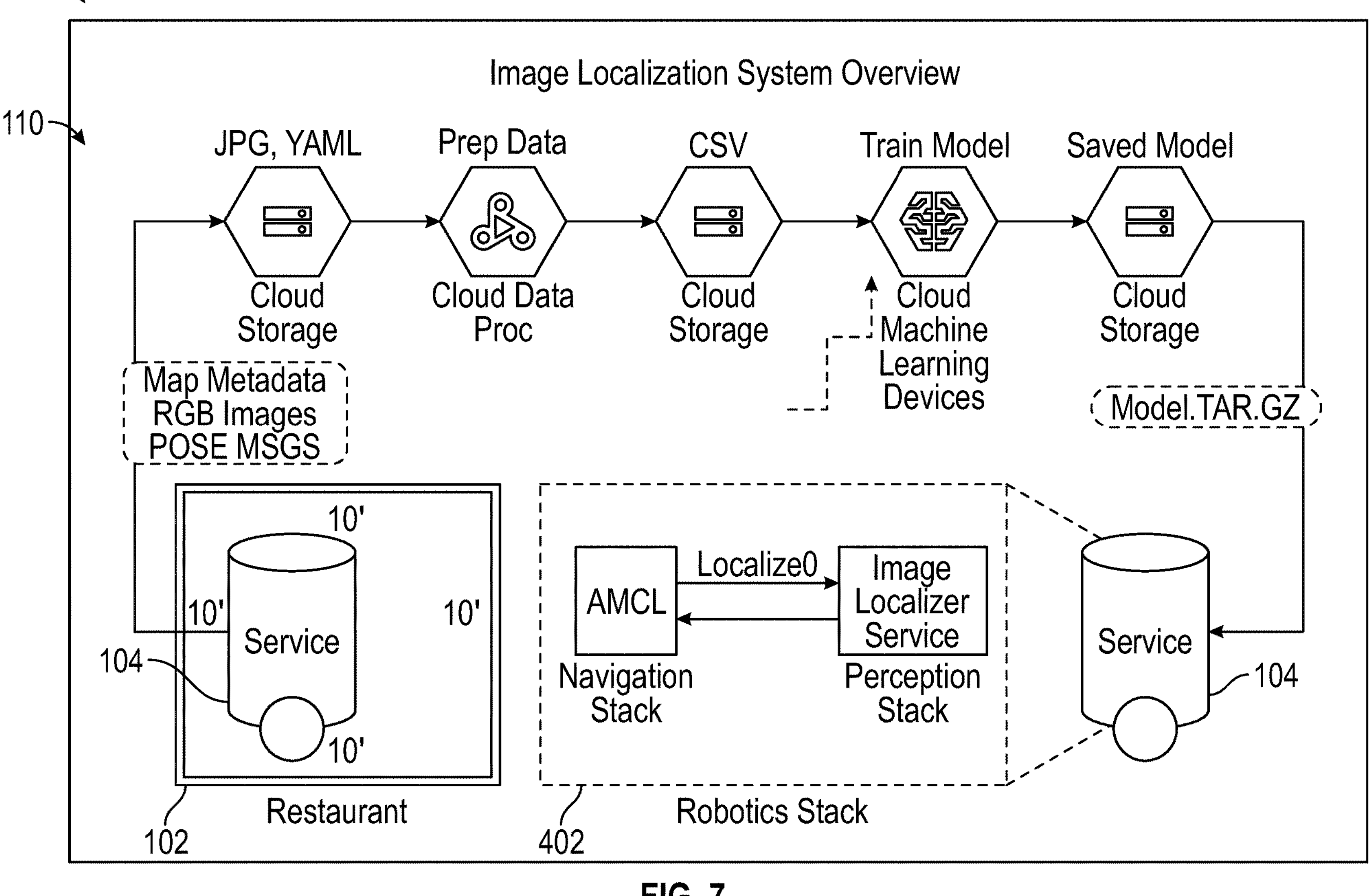
FIG. 7 is a flow diagram showing a model workflow for the creation, maintenance and deployment of image-based localization models, according to some examples.

FIG. 7 is a flow diagram showing a model workflow 702 for the creation, maintenance, and deployment of image-based localization models, according to some examples.

Model workflow 702 may be executed by the model system 602 shown in FIG. 6, within the context of the environment shown in FIG. 1. The workflow 702 starts with data collection (e.g., map metadata, images, pose data or pose messages, as further detailed in FIG. 8) by a data collection and preparation module 606 at a location 102, such as a restaurant. The data collection and preparation module 606 employs data collection strategies that may use sensors of a mobile robot 104 in location 102 for data gathering (see below for details of data collection strategies). In some examples, data collection strategies may also include using sensors that are installed at the location 102 or that are movably deployed (e.g., manually captured by user carry sensors) within the location 102, separately from the mobile robot 104. A sufficient amount of data for a location 102 is collected and stored in cloud storage (e.g., part of cloud services 110). The sufficiency of the amount of data collected may be objectively determined based on a number of criteria, including percentage of area coverage of a location, volume-based criteria, or data resolution criteria. Data can be stored in a variety of formats (e.g., images can be stored in a format such as JPG, GIF, PNG, and more; map metadata and/or image or pose messages can be stored in a format such as YAML, XML, JSON and more).

Collected data is then preprocessed (or prepared) using operations that transform collected raw data into a data set, in the form of prepared data that can be consumed by a model training and evaluation module 608. Data prep (preprocessing or preparation) operations include subsampling and splitting data into train/development/test sets (or train/validation/test sets), as further detailed in the descriptions of FIG. 8 and FIG. 10. Preprocessed data is stored (e.g., in cloud storage) using an appropriate format (e.g., CSV, Parquet and so on). An image-based localization model 604 is then trained using the preprocessed data and cloud machine learning capabilities (see "Model Training and Evaluation" section below). A trained model is saved in remote storage, such as cloud storage (e.g., part of cloud services 110), in an appropriate format and/or optionally compressed (e.g., a "model.tar.gz" file corresponds to a model stored as a compressed .tar file—or a tarball, a collection of files—where the compression is achieved by the gzip utility). Other example compression utilities include bzip2, zstd, and more.

A trained image-based localization model 604 is then deployed to a mobile robot 104 at a given location 102. In some examples, the trained image-based localization model is used by an image localizer, a Robot Operating System (ROS) node that serves image-based localization responses to client requests (see FIG. 12 for more details).

In the subsections below, further details for stages of workflow 702 are provided.

Data Collection Strategy

A data collection and preparation module 606 employs data collection strategies that may use sensors of a mobile robot 104 in location 102 to gather data, including map metadata, images (e.g., image messages), poses (e.g., pose messages including pose estimates) and more. In some examples, image and pose messages may be Robot Operating System (ROS) messages; pose messages may include both position and orientation data.

A service mobile robot 104 may use a probabilistic localization method to compute a pose estimate for the service robot in the context of a pre-computed map of the service environment. The service mobile robot 104 may use an Adaptive Monte Carlo localization (AMCL) method (e.g., as implemented by an AMCL node in the ROS navigation stack, as seen in FIG. 7), for example, using automatically acquired laser scanning data. In some examples, the service mobile robot 104 may use other localization algorithms (e.g., General Monte Carlo localization (GMCL)) and the same or additional types of automatically acquired service environment data (e.g., odometry data, sonar data).

Image and pose messages may furthermore be attributed a timestamp, identifying date (e.g., days) and time information at which the payload information was captured or generated, and a mission identifier identifying a particular mission or travel during which the payload information was captured. Timestamp and mission identifier information may be used, for example, in performing evaluation, validation, and visualization of data collection processes by mobile robots 104. Sensors that are used for data collection include those discussed above with respect to the mobile robot 104, and include multiple RGB cameras, LiDAR sensors, and radar sensors, for example. While for the purpose of main examples we describe data collection by mobile robots, alternative or additional collection processes may include stationary sensors such as cameras, LiDAR, or radar installed at different points in the environment. These sensors can capture information over time and generate a more complete picture of the environment.

Data collection strategies employed by the data collection and preparation module 606 at a location 102 may, in some examples, be intentional or passive.

Intentional data collection may refer to the process of sending a mobile robot 104 on missions specifically for the purpose of collecting data (e.g., image messages, pose messages, map metadata, etc.) using a variety of sensors. An advantage of intentional data collection is that it may provide proper (e.g., more comprehensive and uniform) data coverage over many accessible points on the map.

Passive data collection may refer to the process of sampling (e.g., at a configurable rate) and uploading data to the cloud services 110 while the mobile robot 104 is going about normal delivery operations. In this case, data collection may, in some examples, be turned on/off via config flags. Passive data collection does not require any additional service robot travel at a location and, therefore, does not interfere with the regular restaurant/client operation.

Examples may support both passive and intentional data collection. However, for the purposes of illustration, passive data collection will be discussed below with respect to the example mobile robots 104.

Data Retention Policy

When data collection is enabled across the board, large amounts of data are accumulated by data collection and preparation module 606. While insufficient data may present a bottleneck in many machine-learning applications, too much data is costly, unwieldy, and often unnecessary. To address the above, a data clean-up strategy is implemented by a data collection and preparation module 606 that ensures the retention of sufficient data to train new models, but also prevents the data volume from growing arbitrarily large.

Example data retention strategies or policies are age-based and volume-based.

Age-based retention policy: This example policy retains data for a fixed period of time, such as one month or six months, after which the data is deleted or archived. For example, a data retention policy might specify that data older than 30 days should be deleted from the system.

Volume-based data retention policy: This example policy keeps up to a fixed amount of data expressed as a number of images, an amount of data, or both (e.g., 5-10 k images or 500 MB-1 GB worth of data).

Since mobile robots 104 at different locations 102 are used with varying frequency (e.g., some restaurants may be busier than others), a volume-based retention policy and related retention operations may be implemented to ensure that a uniform amount of data is retained for multiple locations 102.

Other example retention strategies or policies that may be used include:

Rolling window retention policy: In example policies, the retention period is not fixed, but instead, the data is retained for a rolling window of a certain duration, such as the last 30 days or the last 90 days. At the end of each window, the oldest data is deleted or archived to make room for new data. For example, a rolling window retention policy might specify that only the data from the last 30 days is retained at any given time. This seeks to ensure that only the most recent data is retained, which is especially useful for applications where the data is constantly changing.

Quality-based retention policy: This example policy retains data based on its quality rather than the volume. For example, data with higher accuracy, completeness, or relevance can be prioritized for retention, while low-quality data can be discarded. This policy may be implemented when the data collected is variable in quality, and the data retention policy can be adjusted according to data quality metrics.

Hybrid retention policy: Under such example policies, volume, age, and/or quality considerations are taken into account when deciding which data to retain. For example, a fixed amount of data can be retained, but data with higher quality can be prioritized for retention over low-quality data. Such a hybrid approach can strike a balance between retaining enough data for training models and ensuring that the data is of high quality.

Adaptive retention policy: Under such example policies, retention may be automatically adjusted based on changes in the data volume, age, quality, and/or other relevant factors. For example, if the data volume exceeds a certain threshold, the retention policy can be adjusted to reduce the amount of data retained. Similarly, if the data quality deteriorates, the retention policy can be adjusted to retain more high-quality data. Such an approach can help to ensure that the data retention policy remains effective over time, even as conditions change.

Data Preparation

Figure 8:
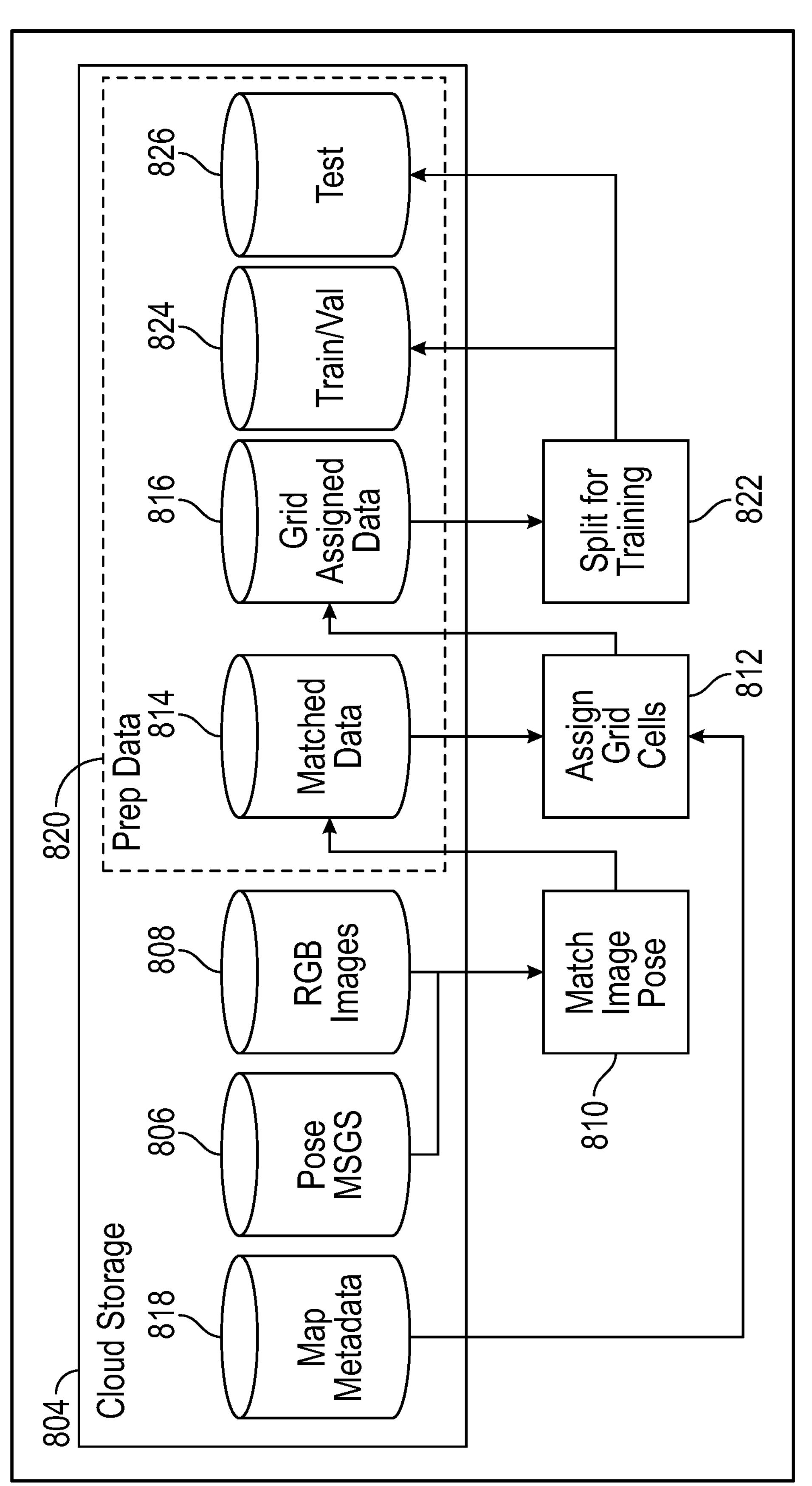
FIG. 8 is a flow diagram illustrating a data preparation flow, according to some examples, as may be performed by a data collection and preparation module to generate data stored in cloud storage.

FIG. 8 is a flow diagram illustrating a data preparation flow 802, according to some examples, as may be performed by the data collection and preparation module 606 to generate data stored in cloud storage 804. Data prep (short for preparation or preprocessing) of the data preparation flow 802 includes operations to transform collected raw data into a data set, in the form of prepared data 820, that may, in some examples, be directly consumed by a model training and evaluation module 608.

Collected raw data includes map metadata 818, pose data or pose messages 806, and images (or image messages) 808. As shown in FIG. 8, since images 808 and pose messages 806 may be collected independently, a matching operation 810 matches images 808 with the corresponding pose messages 806 (e.g., based on their timestamps) to generate matched data 814. An image may be matched to a pose message if their respective timestamps are the same, or if a difference between their respective capture or collection/generation times, as computed based on the timestamps, is smaller than a predetermined time difference (e.g., up to 0.2 secs or 0.3 secs).

Figure 9:
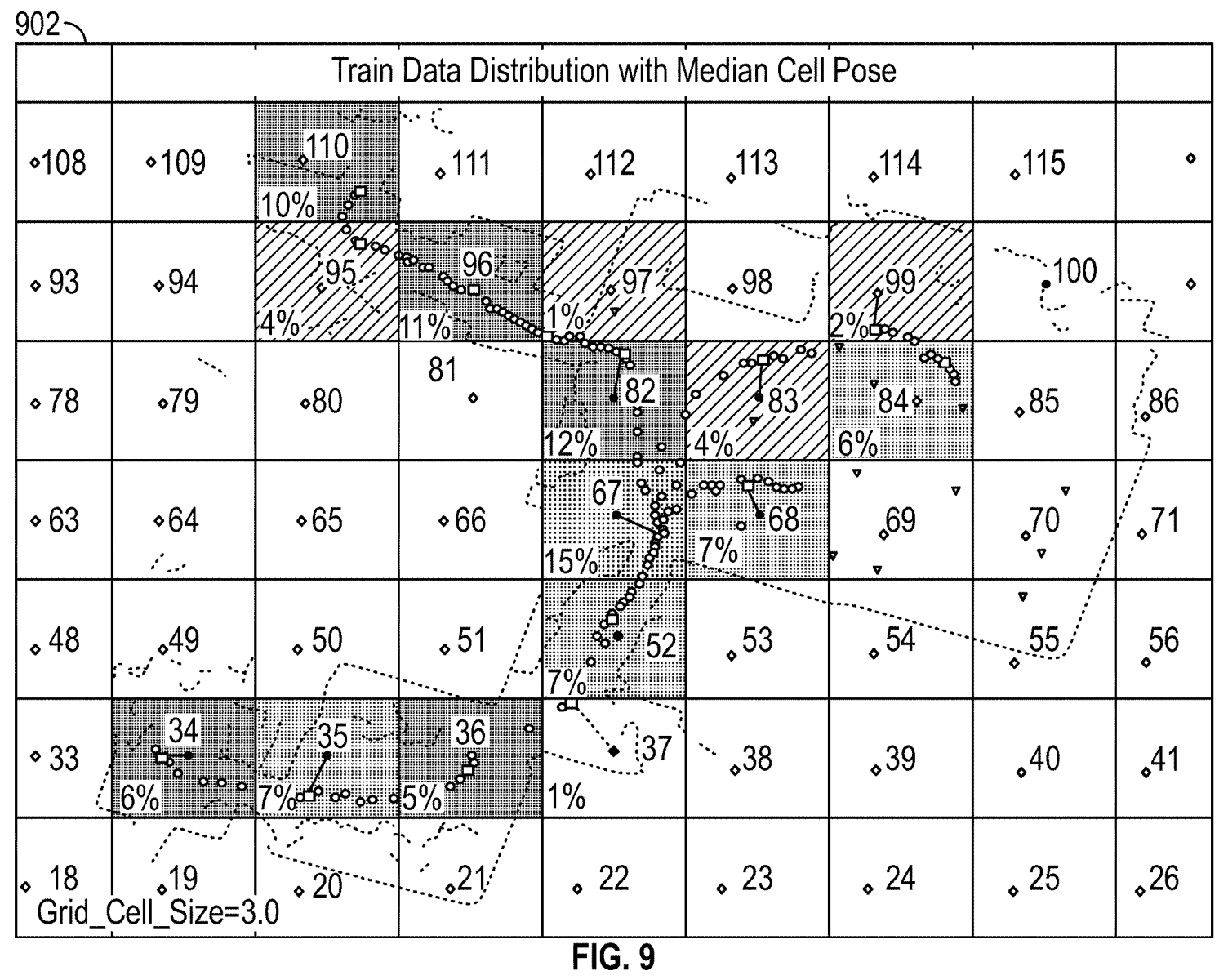

At assignment operation 812, the preprocessing logic of the data collection and preparation module 606 splits a map (e.g., represented by map metadata 818) of a location 102 into a grid of cells (see FIG. 9 for an example of a map 902). Each robot location (e.g., position information or coordinates captured by a pose message 806) is assigned to a particular grid cell (of configurable size) of the map. The output of the assignment operation 812 is stored as grid assigned data 816. The matching operation 810 and the assignment operation 812 may be done on the level of robot missions and may, in some examples, be performed in batch (e.g., daily).

Where raw data (e.g., pose messages 806 and images 808) is collected in a natural operating setting (e.g., passively), certain areas may be traversed by a robot more frequently than others, and therefore certain locations may be more prominently represented in the collected data set than others (see FIG. 9). For example, in a restaurant environment, such frequently traversed areas may include a narrow corridor between the kitchen and the dining area. In order to ensure sufficient coverage of a traversed environment, the preprocessing logic of the data collection and preparation module 606 may sub-sample (or re-sample) the raw data to re-adjust the data distribution such that it is more uniform throughout a navigable space such as a location 102. In some examples, given a set of (e.g., image, pose) pairs augmented with pose-level grid cell assignment information, the data collection and preparation module 606 samples separately from each subset corresponding to a particular grid cell (e.g., it may sub-sample the more frequently occurring grid cells).

A splitting operation 822 splits or divides the grid assigned data 816 for training purposes. For example, the grid assigned data 816 may be split into train/validation sets 824 (or train/development sets 824) and test sets 826 (or test/evaluation sets 826). As mentioned above, the data splitting logic of the data collection and preparation module 606 (e.g., at the splitting operation 822) may take grid cell assignments into account in order to ensure that observed locations appear in a training data set (e.g., the prepared data 820) in a balanced fashion. The splitting operation 822 further seeks to make sure the train/validation sets 824 and the test sets 826 are not too similar (e.g., are sufficiently independent), as further discussed in connection with FIG. 10.

In some examples, data augmentation techniques may be used to augment the data used for training purposes. For instance, photometric augmentation techniques (e.g., adjusting the brightness, color, or contrast of images in the data set in order to obtain additional examples corresponding to a given grid cell/pose message) may be used.

FIG. 9 shows a random sample of several trips worth of raw data collected by mobile robots 104, in the context of a map divided into grid cells of configurable size. Percentage labels presented in conjunction with a subset of the cells indicate the percentage of data points corresponding to each particular cell. FIG. 9 illustrates that raw data is not evenly distributed: for example, the four cells with the greatest percentage of data points cumulatively cover 48% of the collected data in the random sample. This uneven distribution of data by mobile robots 104 may occur in locations 102. In order to ensure that observed locations appear in a training data set (e.g., the prepared data 820) in a balanced fashion, the preprocessing logic of the data collection and preparation module 606 (e.g., at the splitting operation 822) may take grid cell assignments into account as discussed above.

Temporal Data Coupling

Figure 10:
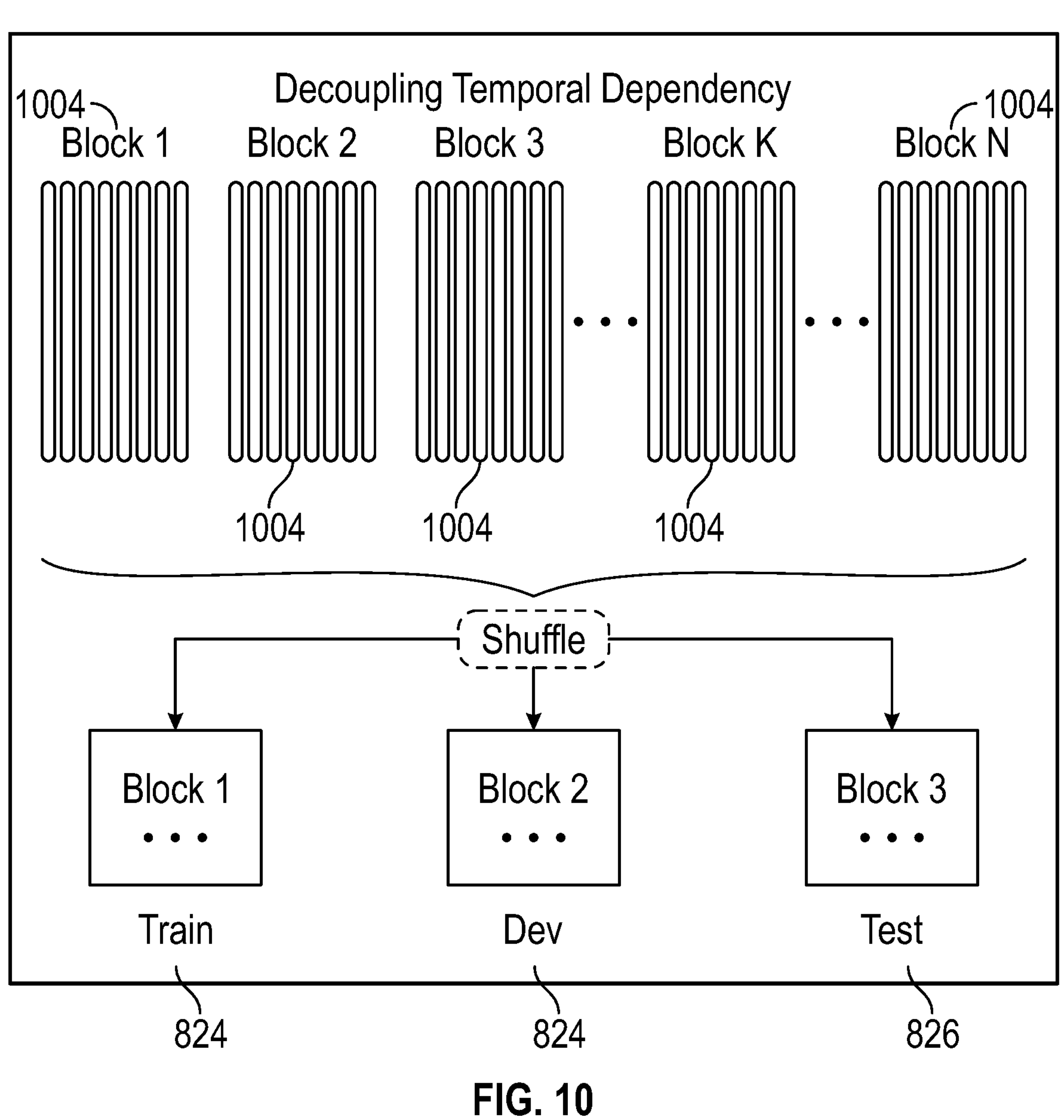
FIG. 10 illustrates a block-based data splitting process, according to some examples, as may be performed by a data collection and preparation module at a splitting operation.

FIG. 10 illustrates a block-based data splitting process 1002, according to some examples, as may be performed by the data collection and preparation module 606 at splitting operation 822.

A challenge in developing machine-learning (ML) models is ensuring that there is no or reduced systematic dependency between the data used to train a model and the data used to evaluate it. In the case of sequences of images (or image-matched pose pairs) collected by a mobile robot (e.g., a mobile robot 104), there may be a strong dependency relationship, in the form of a temporal coupling, between images 808 collected in different time intervals (e.g., any given image will often look similar to the ones observed within a second before or after). Addressing this temporal coupling may be desirable in order to avoid skewed evaluation results.

When data is plentiful, an example strategy for eliminating or reducing this temporal coupling between training/validation (or training/development) data and testing/evaluation data may be time-based data splitting (e.g., date-based time splitting). Time-based data splitting, such as date-based data splitting, refers to using data collected during different missions, or during different capture time periods, for training/validation and testing/evaluation data sets. Missions are indicated by mission identifiers associated with the payload (e.g., images, pose messages, etc.). Capture time periods (e.g., second/minute/hour/day/week/month of capture) can be computed by the data collection and preparation module 606 based on timestamps associated with the payload (e.g., images, pose messages, etc.). The data collection and preparation module 606 may, for example, split captured data (e.g., images, matched image-pose data, etc.) such that data captured from a particular time period is used in a training/validation set but not in a testing/evaluation set (and vice versa).

In addition to such absolute capture time periods computed based on payload timestamps, the data collection and preparation module 606 may use relative capture time periods (e.g., 30 mins-1 month) in order to implement time-based data splitting. Such relative capture time periods may capture the time difference between a first capture time of a chosen first image (or an otherwise chosen first capture time) and a second capture time for a later image. For example, the data collection and preparation module 606 may ensure that images in a training/validation set have been captured within a relative time period of 1 hour with respect to a predetermined capture time (e.g., that of the earliest captured image included in the training set).

However, time-based data splitting may, in some examples, be challenging to implement, for example, where 1,000s of robots operate in diverse environments: a day's worth of data in one location can be 10× smaller or larger than at some other location. Thus, time-based data splitting may, in some use cases, be suboptimal.

Another example strategy for combatting temporal coupling may be random shuffling (e.g., random reordering) of collected payload data such as images (or images and matched pose messages) and assignment of these data to train/validation sets 824 and test sets 826. However, random shuffling may, in some situations and when used alone, still lead to an unacceptably high number of identical or similar images in train/validation and testing/evaluation data sets.

Another example strategy for addressing temporal coupling, for example in the case of sparser data, is to divide a stream of images into blocks of consecutive images (e.g., matched with corresponding pose messages), where blocks have a fixed, configurable, size. Finally, addressing temporal coupling may be done by combining such example strategies in a serial, or otherwise, fashion.

FIG. 10 shows an example block-based data splitting process 1002. First, a collected data stream is partitioned into equally sized blocks 1004 of consecutively captured images (e.g., image-pose pairs). In some examples, the images may not be consecutively captured, but rather captured within a determinable time period or interval. Then, the blocks 1004 are randomly shuffled and assigned to train/validation sets 824 (or train/development sets 824) and to test sets 826.

If the block size is sufficiently large and two consecutive blocks are assigned to train/validation sets 824 and test sets 826, the temporal coupling may be reduced. While larger blocks provide improved temporal decoupling, they may worsen data distribution imbalances with respect to location (as reflected in the distribution across the grid cells corresponding to a map 902). For example, if a robot was sent to one destination for the first ten missions and to another destination for the next ten missions, and if the collected data is split into two equally sized blocks where the size of a block corresponds to a number of missions, the first block will have no data collected from the second destination, and vice versa. Thus block size may, in some examples, be chosen empirically, for example by varying block size and choosing the largest block size, such that the data distribution is sufficiently balanced with respect to observed locations (e.g., as reflected in a distribution over the grid cells of a grid corresponding to an example map 902).

Finally, in some examples, the data collection and preparation module 606 may prepare a separate data set for evaluation or testing purposes, where the separate data set is completely independent of the data used during training. This separate data set may, in some examples, include images and matched pose messages from a different (e.g., more recent) time and/or date. The data set may not have all the locations appearing in the training data set, but it may provide a more up-to-date, accurate, independent and, therefore more useful evaluation metric.

Data Quality Considerations

In general, supervised machine-learning (ML) models are only as good as the data they are trained on ("garbage in, garbage out" rule applies). Since the model system 602, in some examples, may use uncurated data for training models, data quality concerns may be addressed in a number of ways.

First, unless a robot is getting lost with some regularity, it may be assumed that its pose (or generated pose estimate) is reasonably accurate most of the time.

Second, if there are particularly difficult spots in a restaurant for which pose estimates are more likely to be consistently erroneous, such unreliable data points may be filtered out using pose covariance values reported by probabilistic localization methods (e.g., AMCL).

Finally, given that localization methods such as AMCL provide pose estimates rather "ground truth", the pose estimates will inevitably contain some noise. However, the presence of this noise is mitigated by the ML model training setup. Furthermore, some noise in the training data may make the model training more robust, as the model will be less likely to memorize location values corresponding to a particular image in the training set, and therefore it will be less likely to overfit.

Data in Multi-Robot Settings

In some examples, such as in multi-robot setups, data may be collected from multiple robots operating in a single location. Certain robots might not cover all parts of the site (e.g., one robot might be only sent to one part of the building, and another robot sent to another part most of the time). Accordingly, the model system 602 may, in some examples, combine data from different robots and use it for training and/or evaluation.

The data collected by and received from multiple robots may, in some examples, be combined to create a single train/validation set 824. A test/evaluation set 826 may be created using aggregated data from multiple robots, or in some examples, separate data sourced from a single robot.

Keeping a single robot's data exclusively for creating a test/evaluation set 826 may provide some advantages and a better understanding of whether any hardware-related differences in the data affect model performance adversely. For example, this may be a consideration if a restaurant has to swap a robot, but the model was trained on the data collected before the swap.

Model Training and Evaluation

Figure 11:
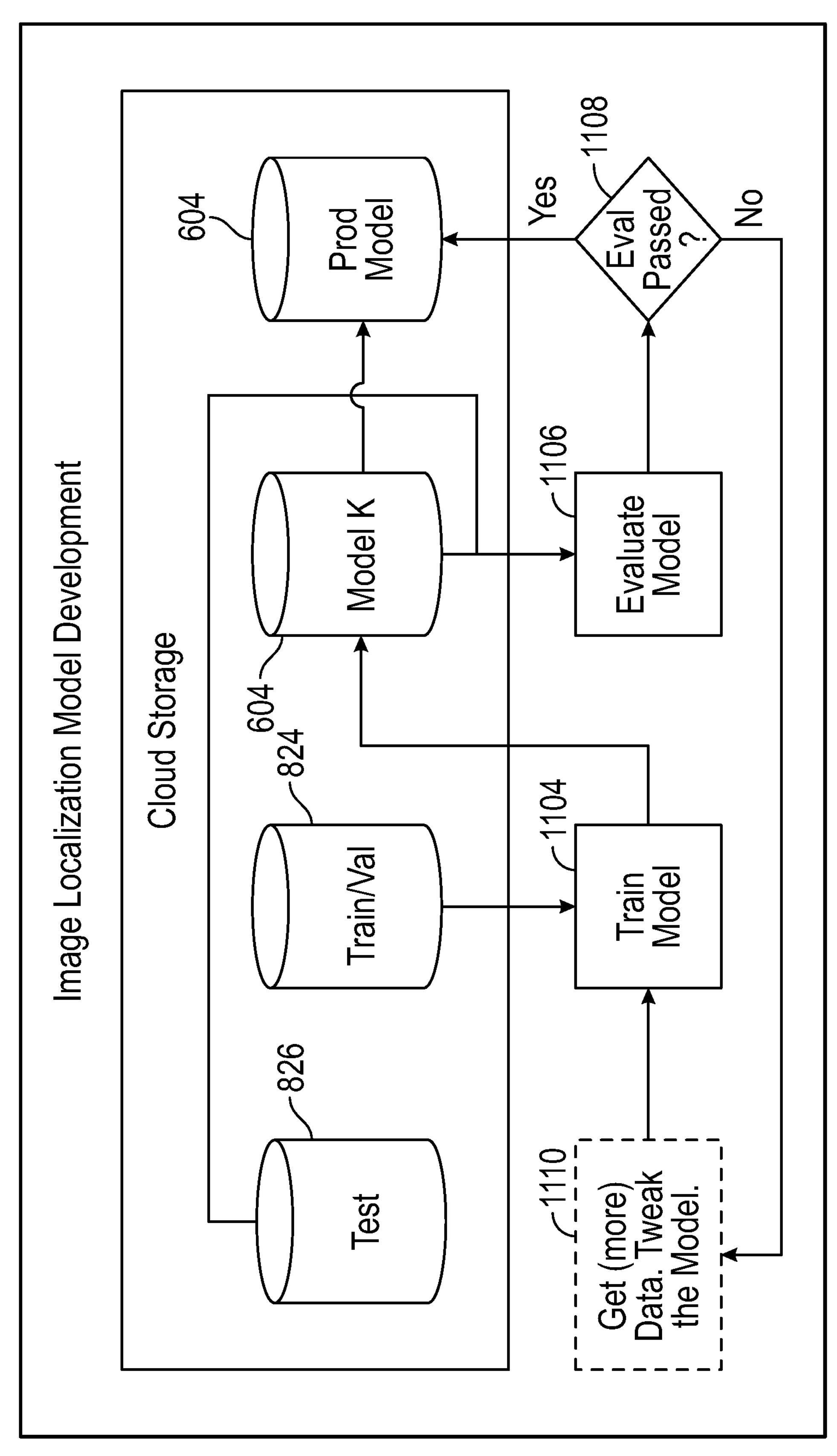
FIG. 11 is a flow diagram illustrating an image-based localization model development process, according to some examples, that may be implemented by a model training and evaluation module.

FIG. 11 is a flow diagram illustrating an image-based localization model development process 1102, according to some examples, that may be implemented by the model training and evaluation module 608. For simplicity, this figure illustrates a model training and evaluation workflow for a model in one location—however, multiple models 604, for multiple locations, are created and/or updated at various times (see the "Model Refresh" section) below.

Once the collected data has been preprocessed and split into train/validation sets 824 and test/evaluation sets 826 by the data collection and preparation module 606, the model training and evaluation module 608 is deployed to train a model 604.

At model training operation 1104, an image-based localization model 604 is trained using a train/validation set 824. An image-based localization model 604 may use a variety of model architectures in a variety of training scenarios, and any combination of them. For example, the model training and evaluation module 608 may use a transfer learning technique: the training module starts with a backbone neural network (NN) pre-trained on a large public dataset (e.g., ImageNet), replaces the final K layers (where K is a predetermined constant, for example 1 or 2) of the backbone neural network with a set of custom layers, and trains the custom layers using the task-specific train/validation set 824. The trained custom layers are then used to produce location predictions for an input image. In some examples, a backbone neural network may be a Vision transformer or EfficientNet. In some examples, a set of custom layers may include one or more fully connected layers, together with a softmax layer as an output layer, the size of the softmax layer corresponding to the number of different grid cell ids for grid cells in a grid map for a specific location.

A trained model is then evaluated at model evaluation operation 1106 by using a test set 826. The results of the evaluation are examined at evaluation-related decision node 1108, which outputs an indicator (e.g., a binary value, a real-valued confidence or satisfaction score, etc.) of whether the model's performance (e.g., on the test set 826) is considered satisfactory with respect to one or more evaluation metrics (e.g., accuracy, precision/recall, AUC, and more).

If the evaluation of the model is satisfactory, the model 604 may be deployed as a production model to a mobile service mobile robot 104. If the model's performance is not satisfactory, at update operation 1110, the model training and evaluation module 608 may augment or replace the train/validation set 824 and retrain the model.

Model Deployment

Figure 12:
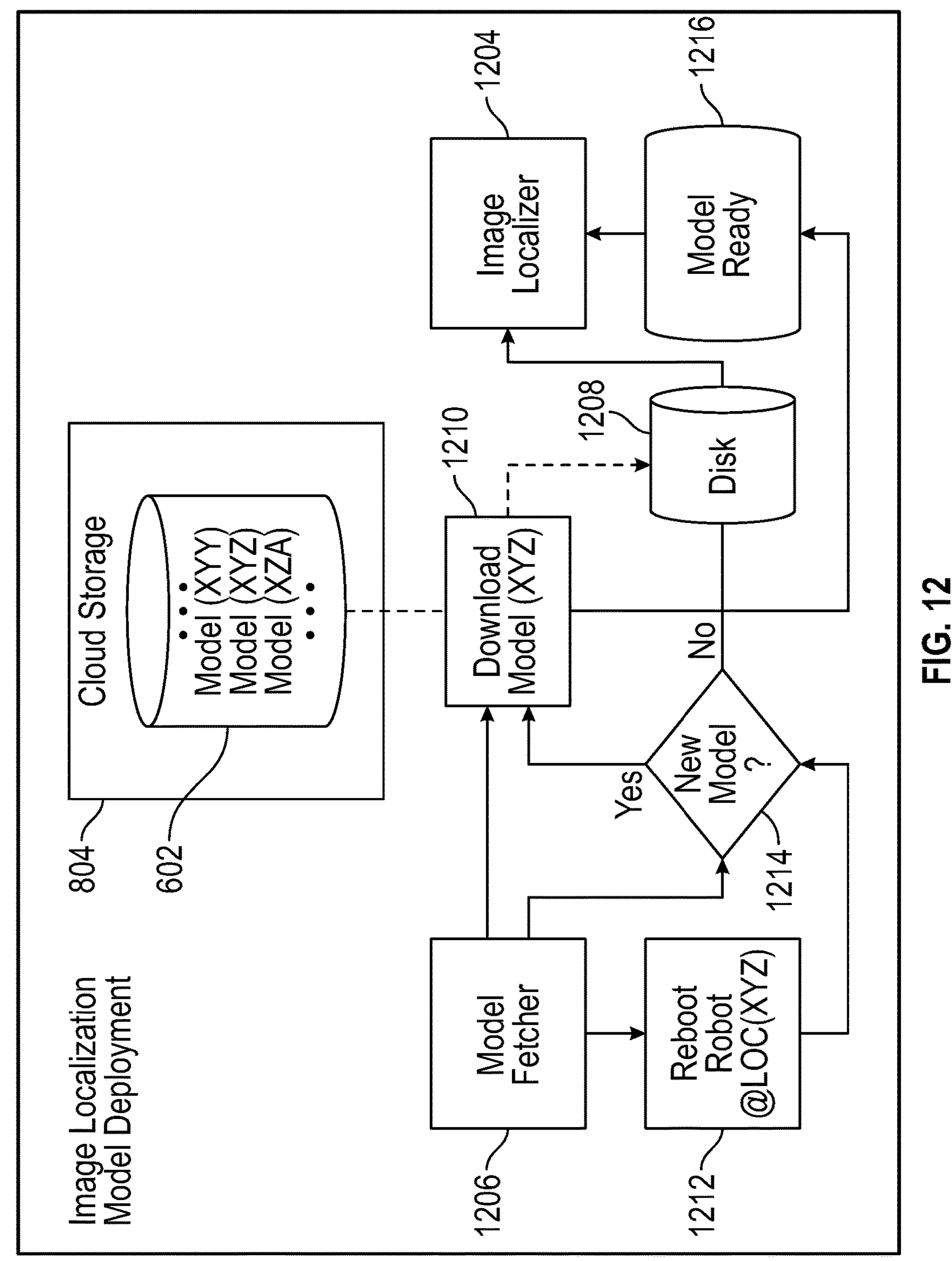
FIG. 12 is a flow diagram illustrating an image-based localization model deployment process, according to some examples, that may be implemented by a model deployment module.

FIG. 12 is a flow diagram illustrating an image-based localization model deployment process 1202, according to some examples, that may be implemented by the model deployment module 610.

As discussed in the section below (see Model Refresh), models 604 for different locations will be created/updated at different times. Moreover, deployed robots (e.g., mobile robots 104) are not necessarily rebooted regularly or, in the case of multiple robots, not all robots are updated at once. Therefore, model deployment, in some examples, happens on the robot instance level (although model training may happen on a single location level). Specifically, a model system 602 may train/prepare new models 604 in the cloud (e.g., using cloud services 110 and stored in cloud storage 804) independent of the robot operation. To achieve asynchronous model deployment, a particular robot may check for the presence of new models on reboot. FIG. 12 illustrates an example of such a process.

An image localizer 1204 is a Robot Operating System (ROS) node that serves image-based localization responses to client requests using an image-based localization model loaded into the memory of a mobile robot 104. The image localizer 1204 is responsible for loading the latest available image-based localization model from disk 1208 of a mobile robot 104 into the memory of the mobile robot (see below).

A model fetcher 1206 is an independent ROS node that checks (e.g., at reboot 1212, via decision operation 1214), whether the latest model 604 for the current location (e.g., location XYZ) in cloud storage 804 (e.g., model XYZ) matches the current model stored on the robot disk 1208. If the latest model 604 for the current location does not match the disk-stored model, the model fetcher 1206, at download operation 1210, downloads the latest model for the current location from cloud storage and updates the model 604 stored on disk 1208. Once a model 604 is available on the local robot disk of a mobile robot 104 (as indicated at operation 1216), an image localizer 1204 may upload the available model into the memory of the mobile robot 104.

In some examples, a model fetcher 1206 may use other policies for triggering a check of whether a new model for a current location is available for download from cloud storage 804. For example, a model fetcher 1206 may periodically (e.g., based on a set time schedule) check for fresh, location-specific models. Alternatively, a model fetcher 1206 may use a conservative policy and check for the availability of a fresh location-specific model only if a new model has not been downloaded in a period of time of a predetermined duration. Finally, a model fetcher may use a combination of these and other policies.

Model Refresh

Figure 13:
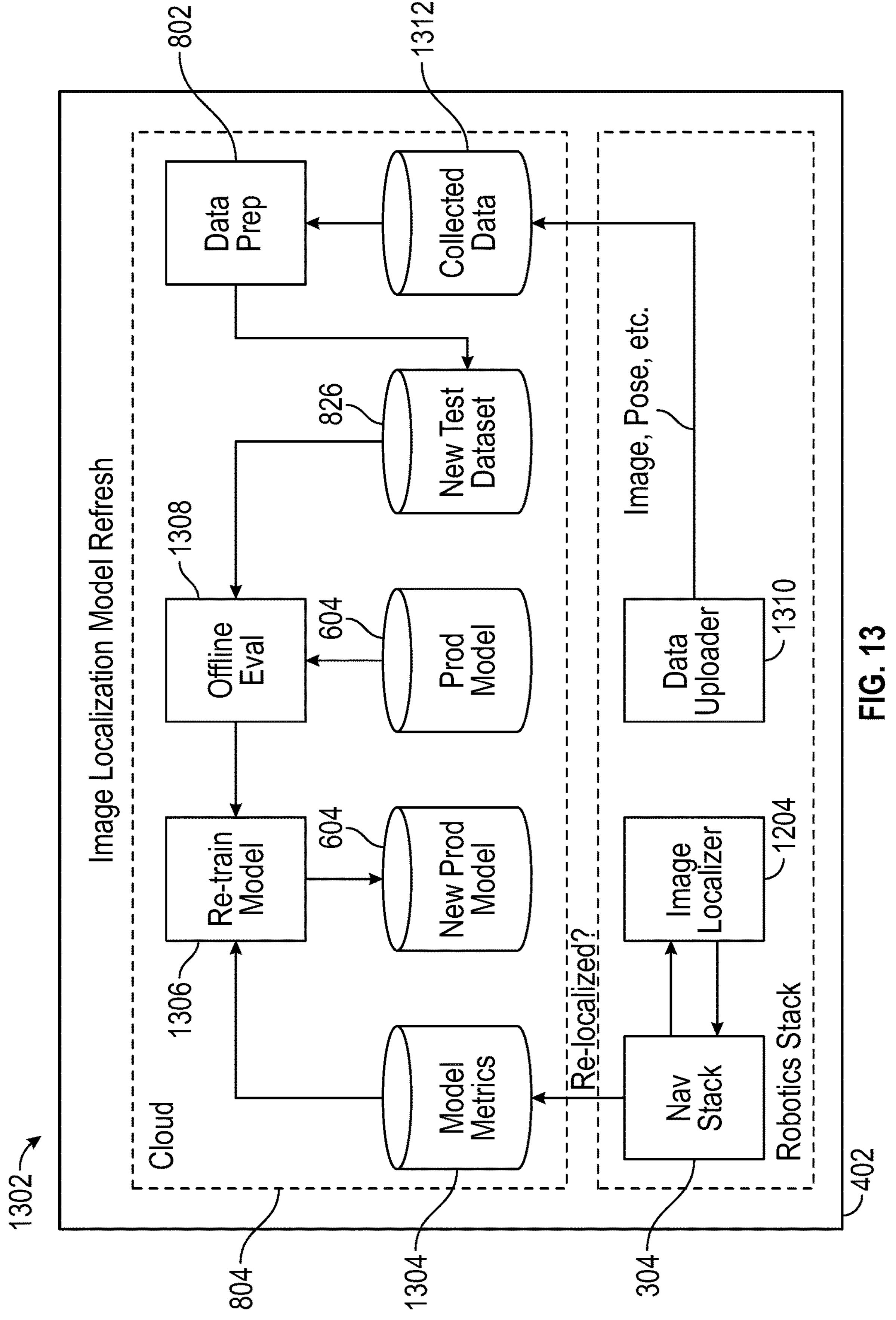
FIG. 13 is a flow diagram illustrating an image-based localization model refresh process, according to some examples, which may be implemented by a model refresh module.

FIG. 13 is a flow diagram illustrating an image-based localization model refresh process 1302, according to some examples, which may be implemented by the model refresh module 612.

The layout of a location 102 (e.g., a restaurant) may change and evolve over time. Changes may, in some examples, be both seasonal (e.g., holiday decorations or more outdoor seating in warmer months) and permanent (e.g., interior renovations). Either way, such changes will impact the performance of models 604 that were trained on older image data. Therefore, the model system 602 provides the ability to automatically update models 604 to avoid performance degradation due to the models becoming stale.

Model refresh by the model refresh module 612 can, for example, be performed either proactively based on a schedule (e.g., monthly/weekly) or reactively based on metrics (e.g., when relocalization convergence rate drops below a threshold). Proactive model refresh seeks to ensure that every location has roughly the same model freshness, but may, in some examples, be wasteful (e.g., some locations will change layout/decorations more frequently than other locations). Reactive model refresh may involve more engineering/design work (e.g., the correct metrics that correctly reflect model performance may need to be collected) but may be less resource wasteful (e.g., no need to update models for locations that have more or less static layouts).

The model refresh process 1302 illustrated in FIG. 13 is a reactive model refresh life cycle, according to some examples. The navigation stack 304 (e.g., part of the robotics stack 402 of a mobile robot 104) reports one or several online model metrics 1304 of model performance for an image-based localization model 604 used by one or more mobile robots 104. As mentioned above, online model metrics may include relocalization convergence rate (e.g., the rate at which a probabilistic localization method such as AMCL converges after relocalization of the mobile robot 104). The model metrics 1304 are stored in a database (e.g., in cloud storage 804). If the performance of the image-based localization model (e.g., as judged by the model metrics 1304) drops, a model 604 is automatically retrained (e.g., at operation 1306) in order to generate a new production model 604. The model retraining operation uses the most recently updated training and test data available. Evaluation metrics may include metrics used in the initial model training and follow-up evaluation (e.g., accuracy, precision, recall, etc.).

In addition to retraining of models 604 using online metrics (e.g., triggering model retraining based on monitoring metrics reported by navigation stack 304), models 604 may, in some examples, be evaluated offline (at operation 1308) using the latest collected data uploaded by the data uploader 1310 of the mobile robot 104. Collected data is prepared via the data preparation flow 802, and new train/validation and testing/evaluation sets are generated accordingly. The offline evaluation, at operation 1308, of the performance of a model 604 can generate values of offline metrics using a newly generated test set containing recently collected data. Such offline metrics can be used by the model refresh module 612 to trigger the retraining of a model 604. Offline metrics may include metrics used in the initial model training/evaluation (e.g., accuracy/precision/recall, for example on a random test sample, and so on). As above, the model retraining operation may use the most recently collected data from the navigable environment, which will ensure that the retrained model will be better adapted to the current configuration and aspect of the environment, rather than being stale.

Model Versioning

Figure 14:
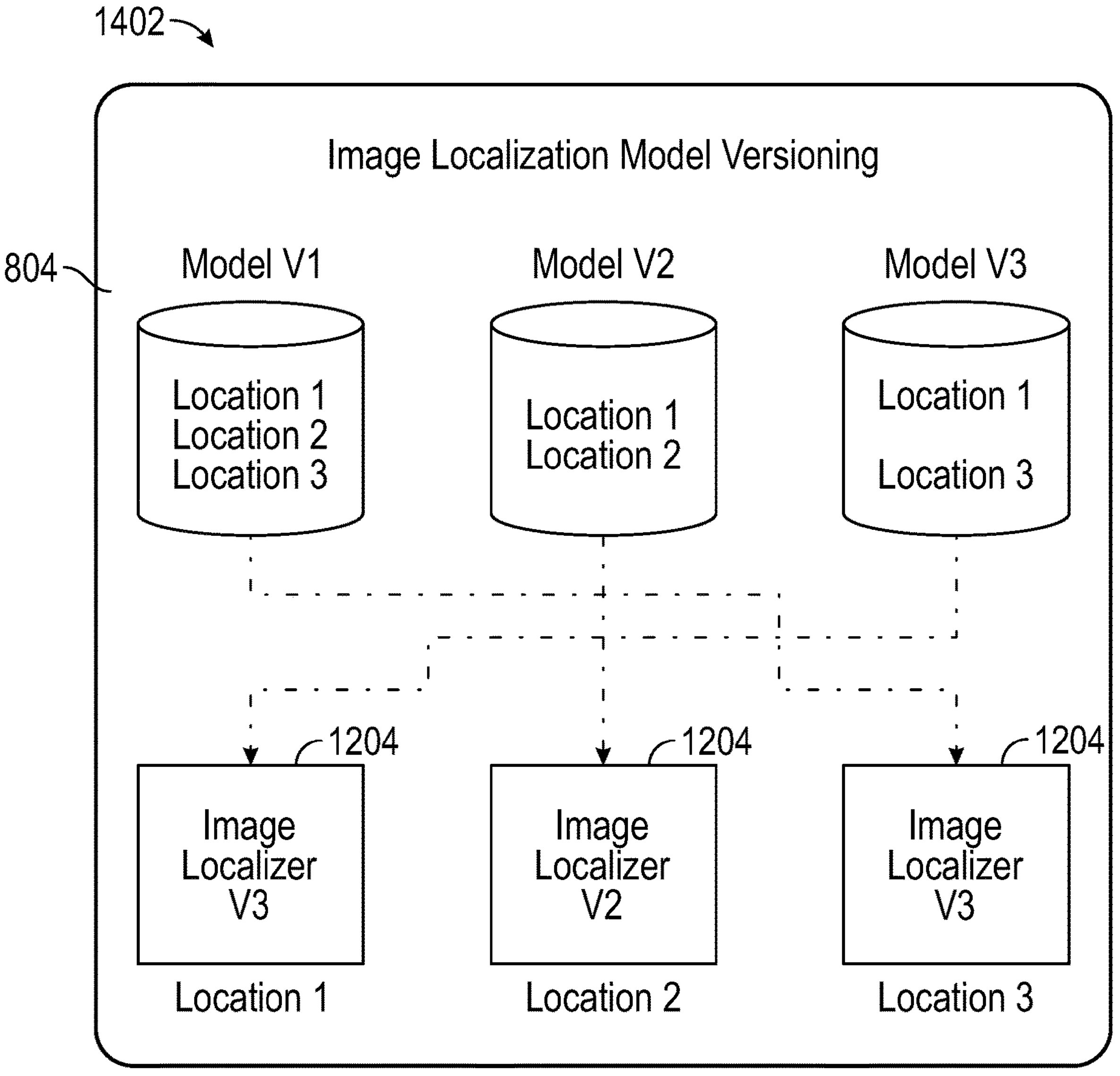
FIG. 14 is a flow diagram illustrating a model versioning process, according to some examples, as may be implemented by a model system.

FIG. 14 is a flow diagram illustrating a model versioning process 1402, according to some examples, as may be implemented by the model system 602.

In the course of model improvement work, a need to change model architecture and/or the serving code may arise. In addition to regularly refreshing models (which does not necessarily involve any model serving code changes) and therefore supporting multiple versions of the same model, the model system 602 may support multiple different model types. However, updating models for multiple robots simultaneously presents a number of technical challenges, both with respect to feasibility and advisability.

When a new type of model 604 is produced in the cloud (e.g., using cloud services 110), the new type of model 604 may not be consumable by a mobile robot 104 until a new robotics software version (e.g., that implements support for this model type) is deployed. Moreover, having a new version of the robotics software on the mobile robot 104 should not require a new model type to be available for its location.

A mechanism for updating model types and/or model versions is thus provided that includes support for different models being deployed to different locations 102 and mobile robots 104. In the case of a single robot, new model deployment may be managed manually. However, when there are large numbers (e.g., 1,000s) of robots with multiple different types of models, automation of this process provides technical and operational advantages.

Some examples handle asynchronous updates via pointers to different locations. For example, the following path structure may, in some examples, be used for storing models in the cloud:

location1/v1/model1.tar.gz
location1/v1/model2.tar.gz
location1/v2/model1.tar.gz
location1/v3/model1.tar.gz
location2/v1/model1.tar.gz
location2/v2/model1.tar.gz
location3/v1/model1.tar.gz
location3/v3/model1.tar.gz For example, the paths listed above indicate that for location 1, versions v1, v2 and v3 of a model 1 are available (e.g., version v1 of model 1 for location 1 is stored in the v1/subdirectory of a location1/directory. Furthermore, paths listed above may indicate that at least two types of models, model 2 and model 1, are present for example at location 1.

On the robot side, updated code may include fallback logic that allows the robot to handle the existence of several model types and/or several model versions of several model types for a particular location. An example of such fallback logic is below:

```
if (path.exists('{location}/v3')) {
model = ModelV3( );
} elif (path.exists('{location}/v2')) {
model = ModelV2( );
elif (path.exists('{location}/v1')) {
model = ModelV1( );
}
```

For example, given a model for a specific location, fallback logic checks whether a subdirectory corresponding to the most recent version (e.g., v3) exists in the directory corresponding to the specific location. If so, version v3 of the corresponding model is used as the current model version. If such a path does not exist, fallback logic checks whether subdirectories corresponding to other model versions (e.g., v2 or v1) exist and identifies a corresponding model version (e.g., v2 or v1).

FIG. 14 shows an example of locations 1, 2, and 3, where different versions of location-related models are stored (e.g., in cloud storage 804) for the different locations (e.g., using some of the storage paths listed above). Location 1 has model versions 1, 2, and 3; location 2 has model versions 1 and 2; and location 3 has model versions 1 and 3. By examining a directory structure (e.g., directory file structure) and storage paths such as those described above, example image localizer nodes for mobile robots in locations 1, 2, or 3 may retrieve (e.g., via a download operation 1210, not shown) the most recent available version of a location-specific model of a particular type. For example, an image localizer 1204 for a mobile robot 104 in location 1 may retrieve version 3 of a model for location 1. Meanwhile, an image localizer 1204 for a mobile robot in location 2 may retrieve version 2 of a model for location 2, and an image localizer 1204 for a mobile robot in location 3 may retrieve version 3 of a model for location 3.

Figure 15:
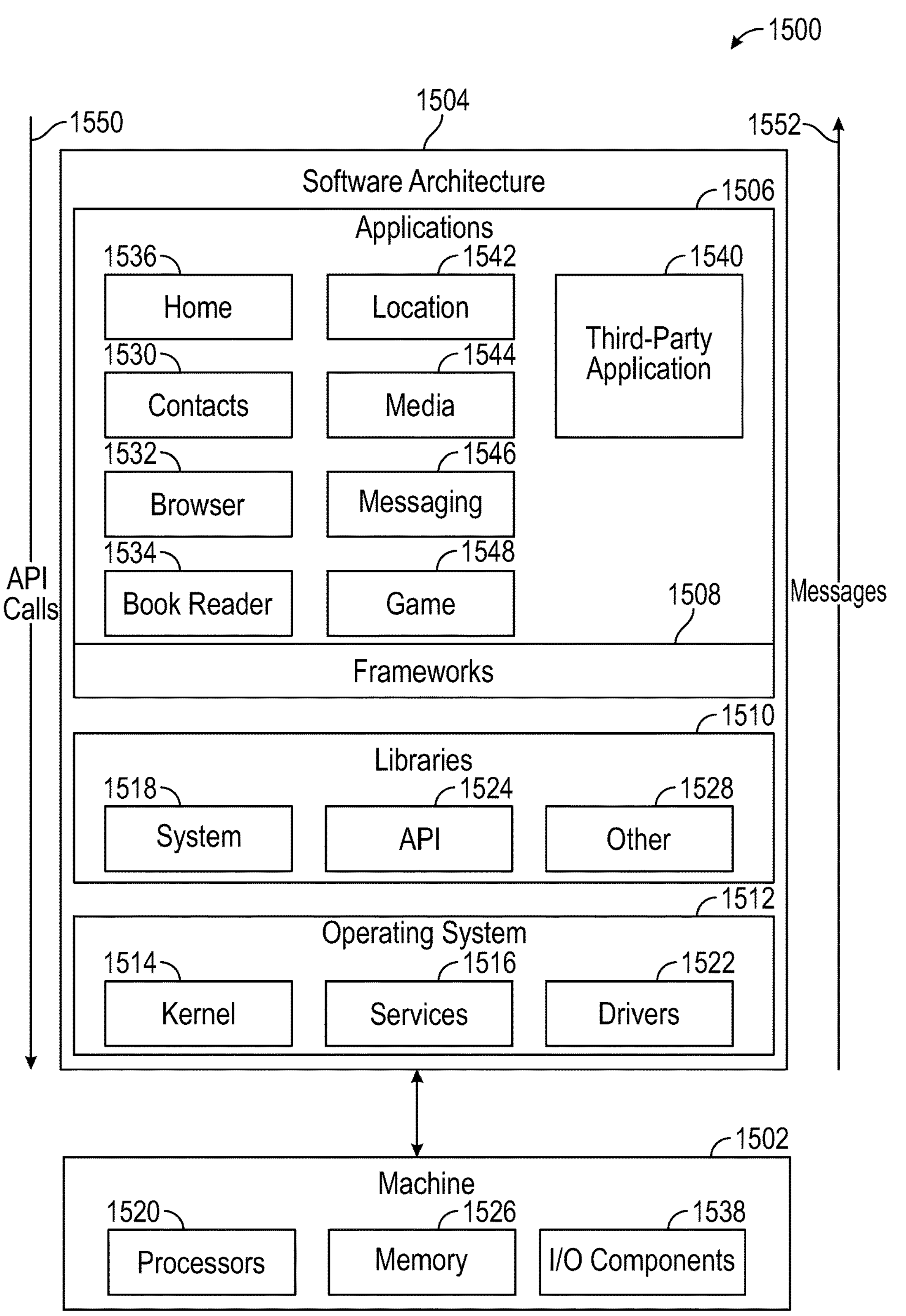
FIG. 15 is a block diagram illustrating a software architecture, which may, according to some examples, be installed on any one or more of the devices described herein.

FIG. 15 is a block diagram 1500 illustrating a software architecture 1504, which may, in some examples be installed on any one or more of the devices described herein. The software architecture 1504 is supported by hardware such as a machine 1502 that includes processors 1520, memory 1526, and I/O components 1538. In this example, the software architecture 1504 may, in some examples, be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, Processor management (e.g., scheduling), component management, networking, and security settings, among other functionalities. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 1510 can also include a wide variety of other libraries 1528 to provide many other APIs to the applications 1506.

The frameworks 1508 provide a high-level common infrastructure used by the applications 1506. For example, the frameworks 1508 provide various graphical user interface (GUI) functions, high-level resource management, and high-level location services. The frameworks 1508 may, in some examples, provide a broad spectrum of other APIs that can be used by the applications 1506, some of which may be specific to a particular operating system or platform.

In some examples, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. Applications 1406 are programs that execute functions defined in the programs. Various programming languages may, in some examples, be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
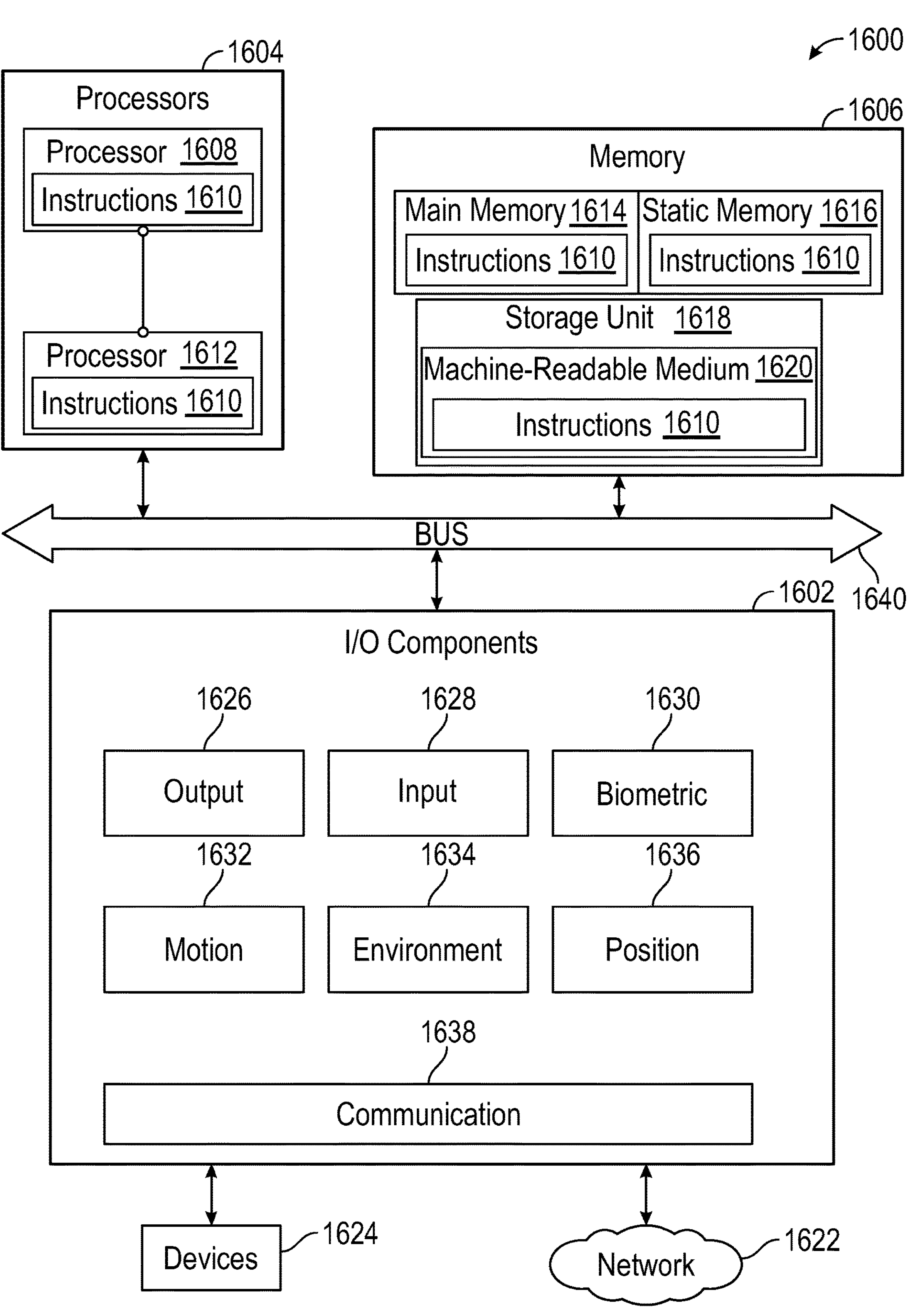
FIG. 16 is a diagrammatic representation of a machine within which instructions (e.g., software, a program, an application, an applet, an app, or other executable code) for causing the machine to perform any one or more of the methodologies discussed herein may be executed, according to some examples.

FIG. 16 is a diagrammatic representation of the machine 1600 within which instructions 1610 (e.g., software, a program, an application, an applet, an app, or other executable code) for causing the machine 1600 to perform any one or more of the methodologies discussed herein may be executed, according to some examples. For example, the instructions 1610 may cause the machine 1600 to execute any one or more of the methods described herein. The instructions 1610 transform the general, non-programmed machine 1600 into a particular machine 1600 programmed to carry out the described and illustrated functions in the manner described. The machine 1600 may operate as a standalone device or be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1610, sequentially or otherwise, that specify actions to be taken by the machine 1600. Further, while a single machine 1600 is illustrated, the term "machine" may include a collection of machines that individually or jointly execute the instructions 1610 to perform any one or more of the methodologies discussed herein.

The machine 1600 may include processors 1604, memory 1606, and I/O components 1602, which may be configured to communicate via a bus 1640. In some examples, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 1608 and a Processor 1612 that execute the instructions 1610. The term "Processor" is intended to include multi-core processors that may comprise two or more independent processors (sometimes referred to as "cores") that may execute instructions contemporaneously. Although FIG. 16 shows multiple processors 1604, the machine 1600 may include a single processor with a single core, a single processor with multiple cores (e.g., a multi-core processor), multiple processors with a single core, multiple processors with multiples cores, or any combination thereof.

The memory 1606 includes a main memory 1614, a static memory 1616, and a storage unit 1618, both accessible to the processors 1604 via the bus 1640. The main memory 1606, the static memory 1616, and storage unit 1618 store the instructions 1610 embodying any one or more of the methodologies or functions described herein. The instructions 1610 may also reside, wholly or partially, within the main memory 1614, within the static memory 1616, within machine-readable medium 1620 within the storage unit 1618, within the processors 1604 (e.g., within the processor's cache memory), or any suitable combination thereof, during execution thereof by the machine 1600.

The I/O components 1602 may include various components to receive input, provide output, produce output, transmit information, exchange information, or capture measurements. The specific I/O components 1602 included in a particular machine depend on the type of machine. For example, portable machines such as mobile phones may include a touch input device or other such input mechanisms, while a headless server machine will likely not include such a touch input device. The I/O components 1602 may include many other components not shown in FIG. 16. In various examples, the I/O components 1602 may include output components 1626 and input components 1628. The output components 1626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 1628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1602 may include biometric components 1630, motion components 1632, environmental components 1634, or position components 1636, among a wide array of other components. For example, the biometric components 1630 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 1632 include acceleration sensor components (e.g., accelerometer), gravitation sensor components, rotation sensor components (e.g., gyroscope). The environmental components 1634 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1636 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1602 further include communication components 1638 operable to couple the machine 1600 to a network 1622 or devices 1624 via respective coupling or connections. For example, the communication components 1638 may include a network interface Component or another suitable device to interface with the network 1622. In further examples, the communication components 1638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1624 may be another machine or any of a wide variety of peripheral devices (e.g., a peripheral device coupled via a USB).

Moreover, the communication components 1638 may detect identifiers or include components operable to detect identifiers. For example, the communication components 1638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 1638, such as location via Internet Protocol (IP) geolocation, location via Wi-Fi® signal triangulation, or location via detecting an NFC beacon signal that may indicate a particular location.

The various memories (e.g., main memory 1614, static memory 1616, and/or memory of the processors 1604) and/or storage unit 1618 may store one or more sets of instructions and data structures (e.g., software) embodying or used by any one or more of the methodologies or functions described herein. These instructions (e.g., the instructions 1610), when executed by processors 1604, cause various operations to implement the disclosed examples.

The instructions 1610 may be transmitted or received over the network 1622, using a transmission medium, via a network interface device (e.g., a network interface component included in the communication components 1638) and using any one of several well-known transfer protocols (e.g., hypertext transfer protocol (HTTP)). Similarly, the instructions 1610 may be transmitted or received using a transmission medium via a coupling (e.g., a peer-to-peer coupling) to the devices 1624.

Figure 17:
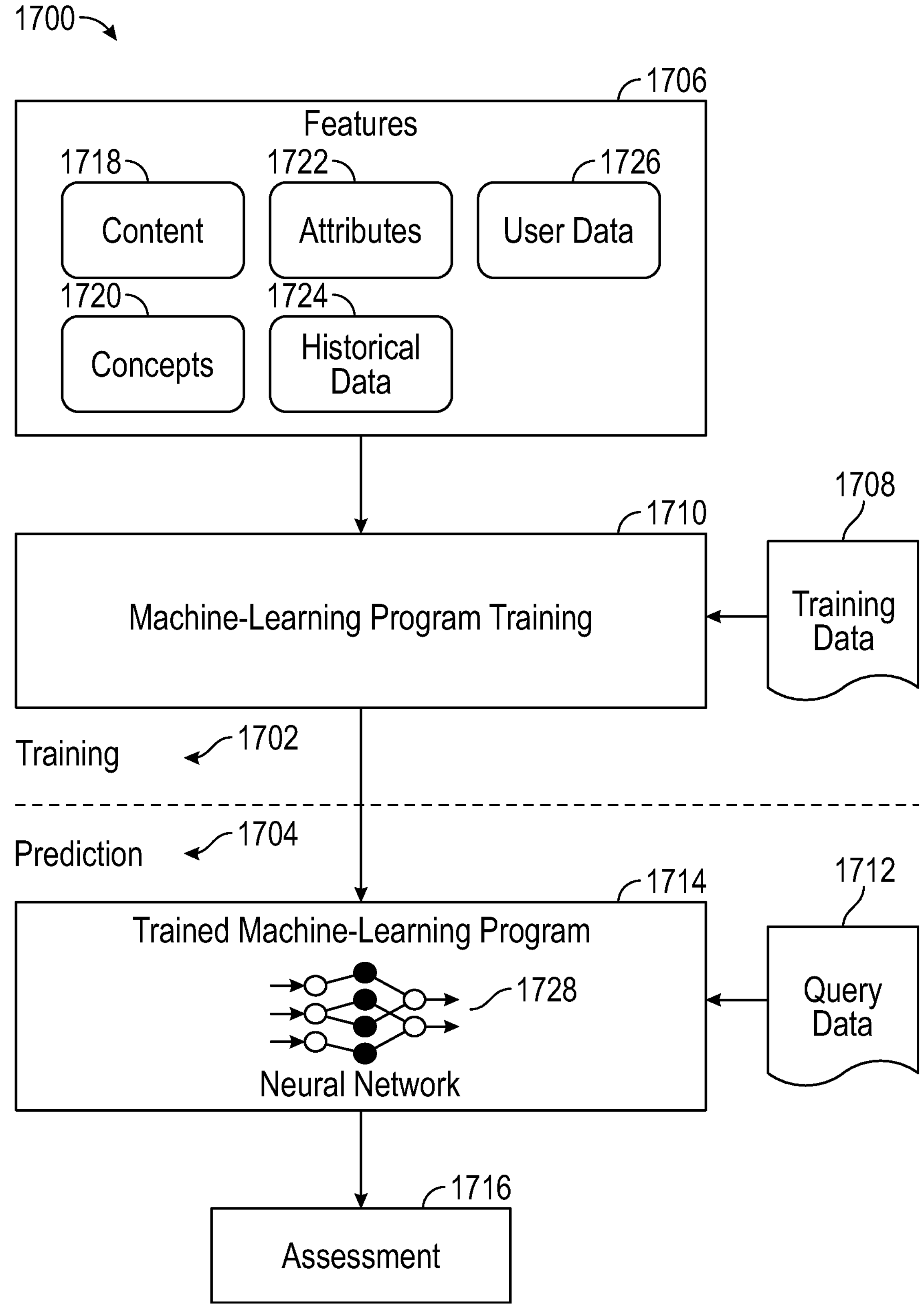
FIG. 17 is a block diagram showing a machine-learning program, according to some examples.

FIG. 17 is a block diagram showing a machine-learning program 1700, according to some examples. The machine-learning programs 1700, also referred to as machine-learning algorithms or tools, are used as part of the systems described herein to perform operations associated with searches and query responses.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine-learning tools operate by building a model from example training data 1708 in order to make data-driven predictions or decisions expressed as outputs or assessments (e.g., assessment 1716). Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning program 1700 supports two types of phases, namely a training phases 1702 and prediction phases 1704. In training phases 1702, supervised learning, unsupervised or reinforcement learning may be used. For example, the machine-learning program 1700 (1) receives features 1706 (e.g., as structured or labeled data in supervised learning) and/or (2) identifies features 1706 (e.g., unstructured or unlabeled data for unsupervised learning) in training data 1708. In prediction phases 1704, the machine-learning program 1700 uses the features 1706 for analyzing query data 1712 to generate outcomes or predictions, as examples of an assessment 1716.

In the training phase 1702, feature engineering is used to identify features 1706 and may include identifying informative, discriminating, and independent features for the effective operation of the machine-learning program 1700 in pattern recognition, classification, and regression. In some examples, the training data 1708 includes labeled data, which is known data for pre-identified features 1706 and one or more outcomes. Each of the features 1706 may be a variable or attribute, such as individual measurable property of a process, article, system, or phenomenon represented by a data set (e.g., the training data 1708). Features 1706 may also be of different types, such as numeric features, strings, and graphs, and may include one or more of content 1718, concepts 1720, attributes 1722, historical data 1724 and/or user data 1726, merely for example.

In training phases 1702, the machine-learning program 1700 uses the training data 1708 to find correlations among the features 1706 that affect a predicted outcome or assessment 1716.

With the training data 1708 and the identified features 1706, the machine-learning program 1700 is trained during the training phase 1702 at machine-learning program training 1710. The machine-learning program 1700 appraises values of the features 1706 as they correlate to the training data 1708. The result of the training is the trained machine-learning program 1714 (e.g., a trained or learned model).

Further, the training phases 1702 may involve machine learning, in which the training data 1708 is structured (e.g., labeled during preprocessing operations), and the trained machine-learning program 1714 implements a relatively simple neural network 1728 capable of performing, for example, classification and clustering operations. In other examples, the training phase 1702 may involve deep learning, in which the training data 1708 is unstructured, and the trained machine-learning program 1714 implements a deep neural network 1728 that is able to perform both feature extraction and classification/clustering operations.

A neural network 1728 generated during the training phase 1702, and implemented within the trained machine-learning program 1714, may include a hierarchical (e.g., layered) organization of neurons. For example, neurons (or nodes) may be arranged hierarchically into a number of layers, including an input layer, an output layer, and multiple hidden layers. The layers within the neural network 1728 can have one or many neurons, and the neurons operationally compute a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some examples, the neural network 1728 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), merely for example.

During prediction phases 1704, the trained machine-learning program 1714 is used to perform an assessment. Query data 1712 is provided as an input to the trained machine-learning program 1714, and the trained machine-learning program 1714 generates the assessment 1716 as output, responsive to receipt of the query data 1712.

Figure 18:
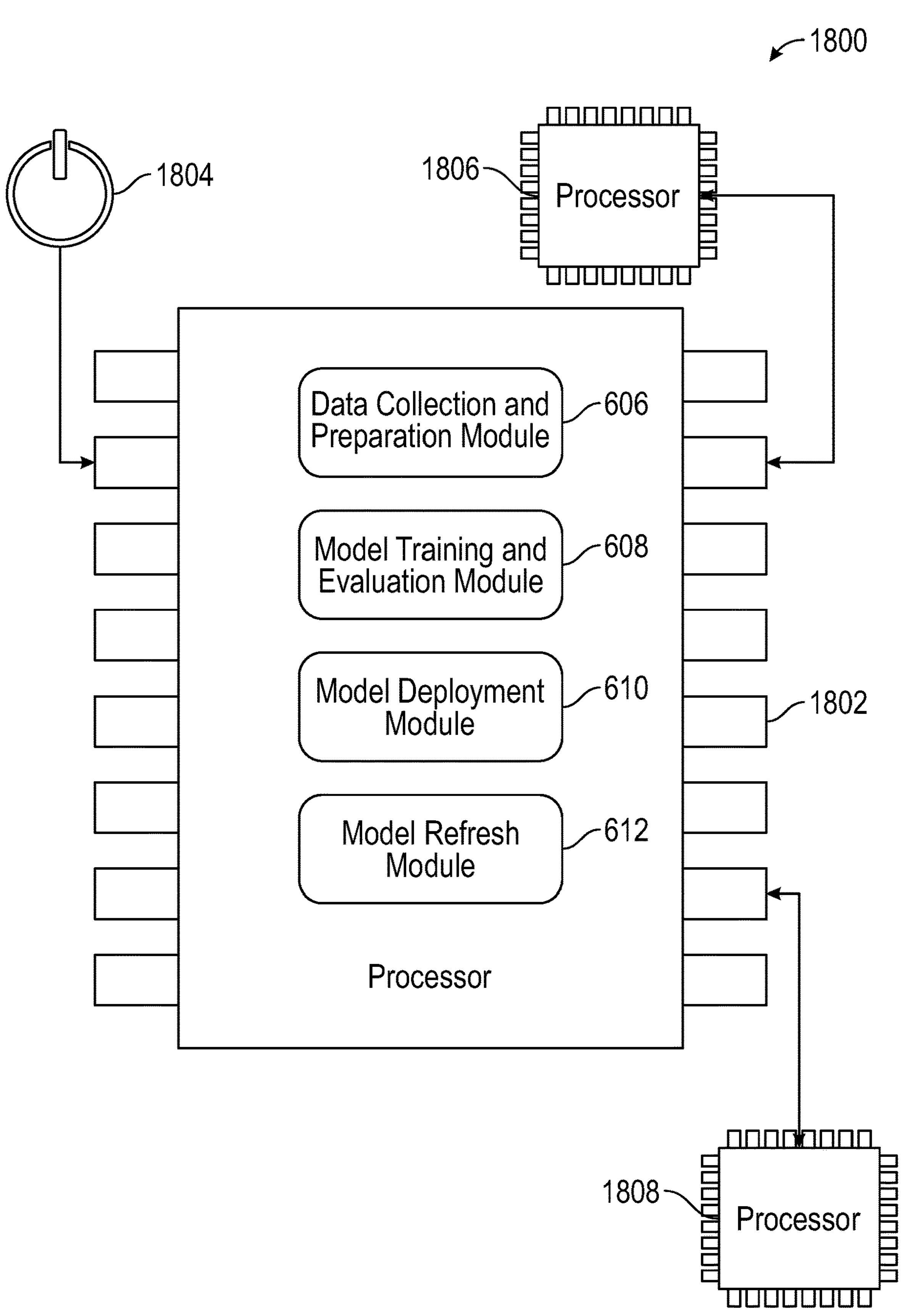
FIG. 18 is a diagrammatic representation of a processing environment, according to some examples.

Turning now to FIG. 18, a diagrammatic representation of a processing environment 1800 is shown, which includes a processor 1802, a processor 1806 and a processor 1808 (e.g., a GPU, CPU, or combination thereof).

The processor processors 1802 is shown to be coupled to a power source 1804, and to include (either permanently configured or temporarily instantiated) modules, namely a data collection and preparation module 606, a model training and evaluation module 608, and a model deployment module 610.

EXAMPLES

1. A method to generate an image-based localization model for mobile robot navigation, the method includes performing data collection at a plurality of different service locations, to which a fleet of mobile robots is deployable, to generate collected data, dividing the collected data into a plurality of blocks of consecutive portions of the collected data, generating a first image-based localization model for a first service location of the plurality of different service locations, using the collected data, generating a second image-based localization model for a second service location of the plurality of different service locations, using the collected data, deploying the first image-based localization model to a first mobile robot of the fleet of mobile robots, the first mobile robot being deployed at the first service location of the plurality of different service locations, the first mobile robot to use the first image-based localization model to navigate the first service location, and deploying a second image-based localization to a second mobile robot of the fleet of mobile robots, the second mobile robot being deployed at the second service location of the plurality of different service locations, the second mobile robot to use the second image-based localization model to navigate the second service location.

2. The method of one or more of the preceding examples, wherein the collected data includes image data, and the dividing includes dividing the image data into equally-sized blocks of consecutive images.

3. The method of one or more of the preceding examples, wherein the generating of the first image-based localization model includes performing training, development, and testing of the first image-based localization model using different ones of the equally-sized blocks of consecutive images.

4. The method of one or more of the preceding examples, wherein shuffling the different ones of the equally-sized blocks of consecutive images before allocating the different ones of the equally-sized blocks of consecutive images to each of the training, the development, and the testing of the image-based localization model.

5. The method of one or more of the preceding examples, further including randomly allocating the different ones of the equally-sized blocks of consecutive images to each of the training, the development, and the testing of the first image-based localization model.

6. The method of one or more of the preceding examples, further including automatically determining a size of each of the equally-sized blocks of consecutive images by balancing the size based on a balanced distribution across grid cells of a map grid of the first service location.

7. The method of one or more of the preceding examples, wherein the image data includes image timestamps, each timestamp indicating a capture time period for a corresponding image, the image timestamps for images in each of the equally-sized blocks of consecutive images indicate a same capture time period for all images in the corresponding block, and the method further includes allocating different ones of the equally-sized blocks of consecutive images to each of the training, the development and the testing of the first image-based localization model based on capture time periods for images in the equally-sized blocks.

8. The method of one or more of the preceding examples, wherein the allocating of the different ones of the equally-sized blocks of consecutive images to each of the training, the development and the testing of the first image-based localization model includes allocating one or more blocks of consecutive images for a first capture time period to only one of the training, development and testing of the first image-based localization model.

9. The method of one or more of the preceding examples, wherein the image data includes mission identifiers, each image in the image data being associated with a mission identifier, images in each of the equally-sized blocks of consecutive images being associated with a unique mission identifier of a plurality of mission identifiers, and the method further includes allocating different ones of the equally-sized blocks of consecutive images to each of the training, the development and the testing of the first image-based localization model based on mission identifiers for images in the equally-sized blocks.

10. The method of one or more of the preceding examples, wherein the allocating of the different ones of the equally-sized blocks of consecutive images to each of the training, the development and the testing of the first image-based localization model includes allocating one or more blocks of consecutive images for a first mission identifier to only one of the training, development and testing of the first image-based localization model.

11. The method of one or more of the preceding examples, wherein the generating of the first image-based localization model for the first service location of the plurality of different service locations further includes retrieving first location data specific to the first service location from the collected data, generating a plurality of online model performance metrics based on the first location data related to a current version of the first image-based localization model, using at least a portion of the first location data, performing an offline evaluation of the current version of the first image-based localization model, and automatically generating a new version of the first image-based localization model for the first service location, based on the offline evaluation. Other technical features may be readily apparent to one skilled in the art from the following figures, descriptions, and claims.

12. The method of one or more of the preceding examples, wherein the plurality of online model performance metrics is reported by a navigation stack of the first mobile robot.

13. The method of one or more of the preceding examples, further including retraining the image-based localization model using the plurality of online model performance metrics.

14. The method of one or more of the preceding examples, further including at the first mobile robot, performing a reboot operation, responsive to the reboot operation and at the first mobile robot, automatically checking remote storage to determine that a new image-based localization model has been generated and stored at the remote storage, responsive to determining that the new image-based localization model has been generated and is stored at the remote storage, storing the new image-based localization model to local memory at the first mobile robot, and at the first mobile robot, serving image-based localization responses to localization requests.

15. The method of one or more of the preceding examples, wherein the automatic checking of the remote storage to determine that the new image-based localization model has been generated and stored at the remote storage includes checking that a retrained version of a current image-based localization model has been generated.

16. The method of one or more of the preceding examples, wherein the automatic checking of the remote storage to determine that the new image-based localization model has been generated and stored at the remote storage includes checking whether a new image-based localization model type has been generated.

17. The method of one or more of the preceding examples, further including at a cloud storage, maintaining a plurality of image-based localization model types, and a plurality of versions of each of the plurality of image-based localization model types, and at the first mobile robot, implementing fallback logic to allow the first mobile robot to use the plurality of image-based localization model types and the plurality of versions of each of the plurality of image-based localization model types.

18. The method of one or more of the preceding examples, wherein the maintaining includes maintaining a file structure to store the plurality of image-based localization model types and the plurality of versions of each of the plurality of image-based localization model types within the cloud storage.

19. The method of one or more of the preceding examples, wherein the fallback logic is included in at a robotics stack of the first mobile robot and accesses the file structure in order to access at least one of the plurality of image-based localization model types or the plurality of versions of each of the plurality of image-based localization model types within the cloud storage.

20. A computing apparatus including at least one processor, and a memory storing instructions that, when executed by the at least one processor, configure the apparatus to carry out the method of any of the preceding examples.

21. A non-transitory computer-readable storage medium, the computer-readable storage medium including instructions that when executed by a computer, cause the computer to carry out the method of any of the preceding examples.

Glossary

"Carrier Signal" refers to any intangible medium capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) tailored to perform the configured functions and are no longer general-purpose processors. A decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), the hardware components need not be configured or instantiated at any one instance in time. For example, where a hardware component comprises a general-purpose processor configured by software to become a special-purpose processor, the general-purpose processor may be configured as different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of methods described herein may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In some examples, the processors or processor-implemented components may be distributed across a number of geographic locations.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term includes solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium", "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, some of which are covered under the term "signal medium."

"Module" refers to logic having boundaries defined by function or subroutine calls, branch points, Application Program Interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some examples, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In examples in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some examples, the processors or processor-implemented modules may be located in a single geographic location (e.g., within a home environment, an office environment, or a server farm). In other examples, the processors or processor-implemented modules may be distributed across a number of geographic locations.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" may include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Various figures of the present application include block diagrams, flowcharts and control flow illustrations of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope. Changes and modifications may be made to the disclosed examples without departing from the scope of the present disclosure. These and other changes and modifications are intended to be within the scope of the present disclosure, as expressed in the following claims.

What is claimed is:

1. A method to generate an image-based localization model for mobile robot navigation, the method comprising:

performing data collection at a plurality of different service locations, to which a fleet of mobile robots is deployable, to generate collected data;

dividing the collected data into a plurality of blocks of consecutive portions of the collected data;

generating a first image-based localization model for a first service location of the plurality of different service locations, using the collected data;

generating a second image-based localization model for a second service location of the plurality of different service locations, using the collected data;

deploying the first image-based localization model to a first mobile robot of the fleet of mobile robots, the first mobile robot being deployed at the first service location of the plurality of different service locations, the first mobile robot to use the first image-based localization model to navigate the first service location;

deploying a second image-based localization to a second mobile robot of the fleet of mobile robots, the second mobile robot being deployed at the second service location of the plurality of different service locations, the second mobile robot to use the second image-based localization model to navigate the second service location, wherein:

the collected data comprises image data, and the dividing comprises dividing the image data into equally-sized blocks of consecutive images;

the generating of the first image-based localization model comprises performing training, development, and testing of the first image-based localization model using different ones of the equally-sized blocks of consecutive images;

the method further comprises shuffling the different ones of the equally-sized blocks of consecutive images before allocating the different ones of the equally-sized blocks of consecutive images to each of the training, the development, and the testing of the image-based localization model; and at least one of the first mobile robot and the second mobile robot executes a localization service module that uses the respective image-based localization model to serve image-based localization responses to localization requests;

at the first mobile robot, performing a reboot operation; and responsive to the reboot operation and at the first mobile robot, automatically checking remote storage to determine that a new image-based localization model has been generated and stored at the remote storage.

2. The method of claim 1, comprising randomly allocating the different ones of the equally-sized blocks of consecutive images to each of the training, the development, and the testing of the first image-based localization model.

3. The method of claim 1, comprising automatically determining a size of each of the equally-sized blocks of consecutive images by balancing the size based on a balanced distribution across grid cells of a map grid of the first service location.

4. The method of claim 1, wherein:

the image data comprises image timestamps, each timestamp indicating a capture time period for a corresponding image;

the image timestamps for images in each of the equally-sized blocks of consecutive images indicate a same capture time period for all images in the corresponding block; and the method further comprises allocating different ones of the equally-sized blocks of consecutive images to each of the training, the development and the testing of the first image-based localization model based on capture time periods for images in the equally-sized blocks.

5. The method of claim 4, wherein the allocating of the different ones of the equally-sized blocks of consecutive images to each of the training, the development and the testing of the first image-based localization model comprises allocating one or more blocks of consecutive images for a first capture time period to only one of the training, development and testing of the first image-based localization model.

6. The method of claim 1, wherein:

the image data comprises mission identifiers, each image in the image data being associated with a mission identifier;

images in each of the equally-sized blocks of consecutive images being associated with a unique mission identifier of a plurality of mission identifiers; and the method further comprises allocating different ones of the equally-sized blocks of consecutive images to each of the training, the development and the testing of the first image-based localization model based on mission identifiers for images in the equally-sized blocks.

7. The method of claim 5, wherein the allocating of the different ones of the equally-sized blocks of consecutive images to each of the training, the development and the testing of the first image-based localization model comprises allocating one or more blocks of consecutive images for a first mission identifier to only one of the training, development and testing of the first image-based localization model.

8. The method of claim 1, wherein the generating of the first image-based localization model for the first service location of the plurality of different service locations further comprises:

retrieving first location data specific to the first service location from the collected data;

generating a plurality of online model performance metrics based on the first location data related to a current version of the first image-based localization model;

using at least a portion of the first location data, performing an offline evaluation of the current version of the first image-based localization model; and automatically generating a new version of the first image-based localization model for the first service location, based on the offline evaluation.

9. The method of claim 8, wherein the plurality of online model performance metrics is reported by a navigation stack of the first mobile robot.

10. The method of claim 8, comprising retraining the image-based localization model using the plurality of online model performance metrics.

11. The method of claim 1, further comprising:

responsive to determining that the new image-based localization model has been generated and is stored at the remote storage, storing the new image-based localization model to local memory at the first mobile robot; and at the first mobile robot, serving image-based localization responses to localization requests.

12. The method of claim 1, wherein the automatic checking of the remote storage to determine that the new image-based localization model has been generated and stored at the remote storage comprises checking that a retrained version of a current image-based localization model has been generated.

13. The method of claim 1, wherein the automatic checking of the remote storage to determine that the new image-based localization model has been generated and stored at the remote storage comprises checking whether a new image-based localization model type has been generated.

14. The method of claim 1, further comprising:

at a cloud storage, maintaining a plurality of image-based localization model types, and a plurality of versions of each of the plurality of image-based localization model types; and at the first mobile robot, implementing fallback logic to allow the first mobile robot to use the plurality of image-based localization model types and the plurality of versions of each of the plurality of image-based localization model types.

15. The method of claim 14, wherein the maintaining comprises maintaining a file structure to store the plurality of image-based localization model types and the plurality of versions of each of the plurality of image-based localization model types within the cloud storage.

16. The method of claim 15, wherein the fallback logic is included in at a robotics stack of the first mobile robot and accesses the file structure in order to access at least one of the plurality of image-based localization model types or the plurality of versions of each of the plurality of image-based localization model types within the cloud storage.

17. A computing apparatus comprising:

at least one processor; and a memory storing instructions that, when executed by the at least one processor, configure the apparatus to:

perform data collection at a plurality of different service locations, to which a fleet of mobile robots is deployable, to generate collected data;

divide the collected data into a plurality of blocks of consecutive portions of the collected data;

generate a first image-based localization model for a first service location of the plurality of different service locations, using the collected data;

generate a second image-based localization model for a second service location of the plurality of different service locations, using the collected data;

deploy the first image-based localization model to a first mobile robot of the fleet of mobile robots, the first mobile robot being deployed at the first service location of the plurality of different service locations, the first mobile robot to use the first image-based localization model to navigate the first service location;

deploy a second image-based localization to a second mobile robot of the fleet of mobile robots, the second mobile robot being deployed at a second service location of the plurality of different service locations, the second mobile robot to use the second image-based localization model to navigate the second service location, wherein:

the collected data comprises image data, and dividing the collected data comprises dividing the image data into equally-sized blocks of consecutive images;

generating the first image-based localization model comprises performing training, development, and testing of the first image-based localization model using different ones of the equally-sized blocks of consecutive images;

the instructions further configure the apparatus to shuffle the different ones of the equally-sized blocks of consecutive images before allocating the different ones of the equally-sized blocks of consecutive images to each of the training, the development, and the testing of the image-based localization model; and at least one of the first mobile robot and the second mobile robot executes a localization service module that uses the respective image-based localization model to serve image-based localization responses to localization requests;

at the first mobile robot, performing a reboot operation; and responsive to the reboot operation and at the first mobile robot, automatically checking remote storage to determine that a new image-based localization model has been generated and stored at the remote storage.

* * * * *